(12) United States Patent  
Sandbach

(10) Patent No.: US 7,161,084 B2  
(45) Date of Patent: *Jan. 9, 2007

(54) DETECTOR CONSTRUCTED FROM ELECTRICALLY CONDUCTING FABRIC

(75) Inventor: David L Sandbach, London (GB)

(73) Assignee: Electrotextiles Company Limited, Hertfordshire (GB)

( * ) Notice: Subject to any disclaimer, the term of this patent is extended or adjusted under 35 U.S.C. 154(b) by 692 days.

This patent is subject to a terminal disclaimer.

(21) Appl. No.: 09/980,298

(22) PCT Filed: Mar. 30, 2001

(86) PCT No.: PCT/GB01/01445

§ 371 (c)(1),  
(2), (4) Date: Nov. 29, 2001

(87) PCT Pub. No.: WO01/75924

PCT Pub. Date: Oct. 11, 2001

(65) Prior Publication Data

US 2002/0134116 A1   Sep. 26, 2002

(30) Foreign Application Priority Data

Mar. 30, 2000   (GB) .................................. 0007679.4  
Mar. 30, 2000   (GB) .................................. 0007680.2

(51) Int. Cl.  
*H01B 7/08*   (2006.01)

(52) U.S. Cl. ................................. 174/117 M; 338/101

(58) Field of Classification Search ............ 174/117 F, 174/117 M; 338/101; 200/85 R, 86 R  
See application file for complete search history.

(56) References Cited

U.S. PATENT DOCUMENTS 3,056,005 A * 9/1962 Larson ...................... 200/86 R (Continued)

FOREIGN PATENT DOCUMENTS

DE        89 01 047        4/1989

(Continued)

OTHER PUBLICATIONS

International Search Report—PCT/GB01/01445, completed Jul. 19, 2001, ISA/EP.

(Continued)

*Primary Examiner*—Chau N. Nguyen  
(74) *Attorney, Agent, or Firm*—Harness, Dickey & Pierce, P.L.C.

(57) ABSTRACT

The present invention relates to a detector constructed from electrically conducting fabric and configured to present a varying electrical characteristic in response to a mechanical interaction. The detector comprises a first conducting layer (401) which is displaced from a second conducting layer (402) such that conduction between the layers results when the layers are mechanically forced together. In addition, the first of the layers has a plurality of lengths of conductive yarn and a plurality of lengths of non-conductive yarn machined therein, such that at least one length of conductive yarn is electrically isolated from another of the lengths of conductive yarn and the conducting yarns in the first of the layers are electrically grouped to define a plurality of identifiable rows. Each identifiable row has a respective electrical conductor; and define specific regions of the detector.

35 Claims, 27 Drawing Sheets

U.S. PATENT DOCUMENTS

| | | | |
|---|---|---|---|
| 3,396,252 A | | 8/1968 | Serizawa et al. |
| 3,617,666 A | * | 11/1971 | Braue ................... 200/86 R |
| 3,911,215 A | | 10/1975 | Hurst et al. |
| 4,143,236 A | * | 3/1979 | Ross et al. ................ 174/32 |
| 4,220,815 A | | 9/1980 | Gibson et al. |
| 4,633,237 A | | 12/1986 | Tucknott et al. |
| 4,659,873 A | | 4/1987 | Gibson et al. |
| 4,687,885 A | | 8/1987 | Talmage, Jr. et al. |
| 4,704,501 A | | 11/1987 | Taguchi et al. |
| 4,707,845 A | | 11/1987 | Krein et al. |
| 4,725,696 A | | 2/1988 | Furukawa et al. |
| 4,795,998 A | | 1/1989 | Dunbar et al. |
| 4,798,919 A | | 1/1989 | Miessler et al. |
| 5,047,602 A | | 9/1991 | Lipka |
| 5,089,672 A | | 2/1992 | Miller |
| 5,159,159 A | | 10/1992 | Asher |
| 5,262,778 A | | 11/1993 | Saunders |
| 5,453,941 A | | 9/1995 | Yoshikawa |
| 5,686,705 A | | 11/1997 | Conroy et al. |
| 5,815,139 A | | 9/1998 | Yoshikawa |
| 5,852,260 A | | 12/1998 | Yoshikawa |
| 6,861,961 B1 | * | 3/2005 | Sandbach et al. ............ 341/22 |

FOREIGN PATENT DOCUMENTS

| | | |
|---|---|---|
| DE | 44 35 829 | 4/1996 |
| DE | 89 01 047 | 5/1999 |
| EP | 0 261 770 | 3/1988 |
| EP | 0 989 509 | 3/2000 |
| GB | 1 308 575 | 2/1973 |
| GB | 2 341 932 | 3/2000 |
| GB | 2 350 431 | 11/2000 |
| GB | 2 350 683 | 12/2000 |
| JP | 58-022436 | 2/1983 |

OTHER PUBLICATIONS

Post, E. Rehmi; Orth, Margaret; "Smart Fabric, or "Wearable Clothing", " 1997; pp. 167-168; IEEE.

* cited by examiner $$Rv \propto \frac{1}{V_1} + \frac{1}{V_2}$$

810

$$\frac{1}{Rv} \sim \propto AREA.FORCE$$

811

DETECTOR CONSTRUCTED FROM ELECTRICALLY CONDUCTING FABRIC

BACKGROUND OF THE INVENTION

The present invention relates to a detector constructed from electrically conducting fabric and configured to present a varying electrical characteristic in response to a mechanical interaction.

A fabric touch sensor for providing positional information is disclosed in U.S. Pat. No. 4,659,873 of Gibson. The sensor of Gibson is fabricated using two layers of fabric having conducting threads, where said conducting layers are separated by a resistive layer to prevent unintentional contact. The Gibson device is primarily an overlay for a visual display unit whereby the position of finger contacts may be identified in response to the display of representational icons, such as buttons etc. An electrical potential is applied across at least one of the layers and a voltage detected at a position of contact allows a position on the touch screen to be detected.

A problem with this configuration is that it is only capable of detecting a single touch and cannot identify two or more separate touches.

In some circumstances, it is desirable to provide a flexible detector constructed from electrically conducting fabric in which it is possible to detect two or more contact locations.

A proposal for achieving this is disclosed by the present applicants in British Patent application No. 2 341 932 and co-pending Australian patent application No. 48770/99, European patent application No. 99307539, Japanese Patent application No. 11-272513, Korean patent application No. 99-40363 and U.S. patent application Ser. No. 09/298,172. In these co-pending patent applications, one of the conducting planes is divided into a plurality of smaller planes, the operation of which is then time multiplexed so as to facilitate the detection of a plurality of mechanical interactions, provided that said interactions occur in different multiplexed regions.

A lower planar sheet is provided with connections at each of its corners to provide a two-dimensional co-ordinate position within the sheet area. An upper sheet is then divided into a plurality of portions and a mechanical interaction results in conducting planes of at least one of these portions being made active.

In order to achieve space division multiplexing of the regions, the electrical signals are time multiplexed such that operations upon each region are provided during a respective time slot. Each individual region is provided with its unique electrical connector established within the structure of this sheet.

Each output line associated with a region is provided with a respective buffering amplifier and a complete scanning cycle involves the application of a voltage between input terminals whereafter an output is considered from each of the individual output terminals.

A problem with this approach to providing a multiplexed sheet is that the construction of such a sheet is relatively difficult and thereby leads to significant constructional costs; thereby limiting its area of application. In addition, this approach requires the use of a 5-wire system, as distinct from the preferred 4-wire system, resulting in non-uniform electric fields and a requirement for compensation to be provided. This introduces further problems in terms of calibration and also in terms of loss of resolution.

An electrical switch using fabric elements is disclosed in British patent application No 1,308,575 in which conductive rows are made by coating portions of the fabric with an electrically conductive metal, such as silver or chromium. Manual pressure applied at particular regions may be detected by the intersection of a particular row and column being brought into contact but the presence of a continuous metal layer significantly restricts the flexibility of the device as a whole. This is emphasised by the fact that the device is to be constructed upon a rigid board and as such many of the benefits from using a fabric material are effectively lost.

BRIEF SUMMARY

According to a first aspect of the present invention, there is provided a detector constructed from electrically conducting fabric and configured to present a varying electrical characteristic in response to a mechanical interaction, wherein a first conducting layer is displaced from a second conducting layer such that conduction between said layers results when said layers are mechanically forced together, characterised in that the first of said layers has a plurality of lengths of conductive yarn and a plurality of lengths of non-conductive yarn machined therein, such that at least one length of conductive yarn is electrically isolated from another of said lengths of conductive yarn, said conducting yarns in the first of said layers are electrically grouped to define a plurality of identifiable rows; each said identifiable row has a respective electrical conductor, and said identifiable rows define specific regions of the detector.

An advantage of this configuration is that each of the conducting layers may be manufactured as a homogenous sheet using conventional textile manufacturing techniques. Furthermore, when assembled in the form of a detector, the detector itself remains flexible and all of the advantages of its textile construction may be utilised.

BRIEF DESCRIPTION OF THE DRAWINGS

The invention will now be described by way of example only, with reference to the accompanying drawings in which.

DETAILED DESCRIPTION OF THE PREFERRED EMBODIMENTS

FIG. 1

Figure 1:
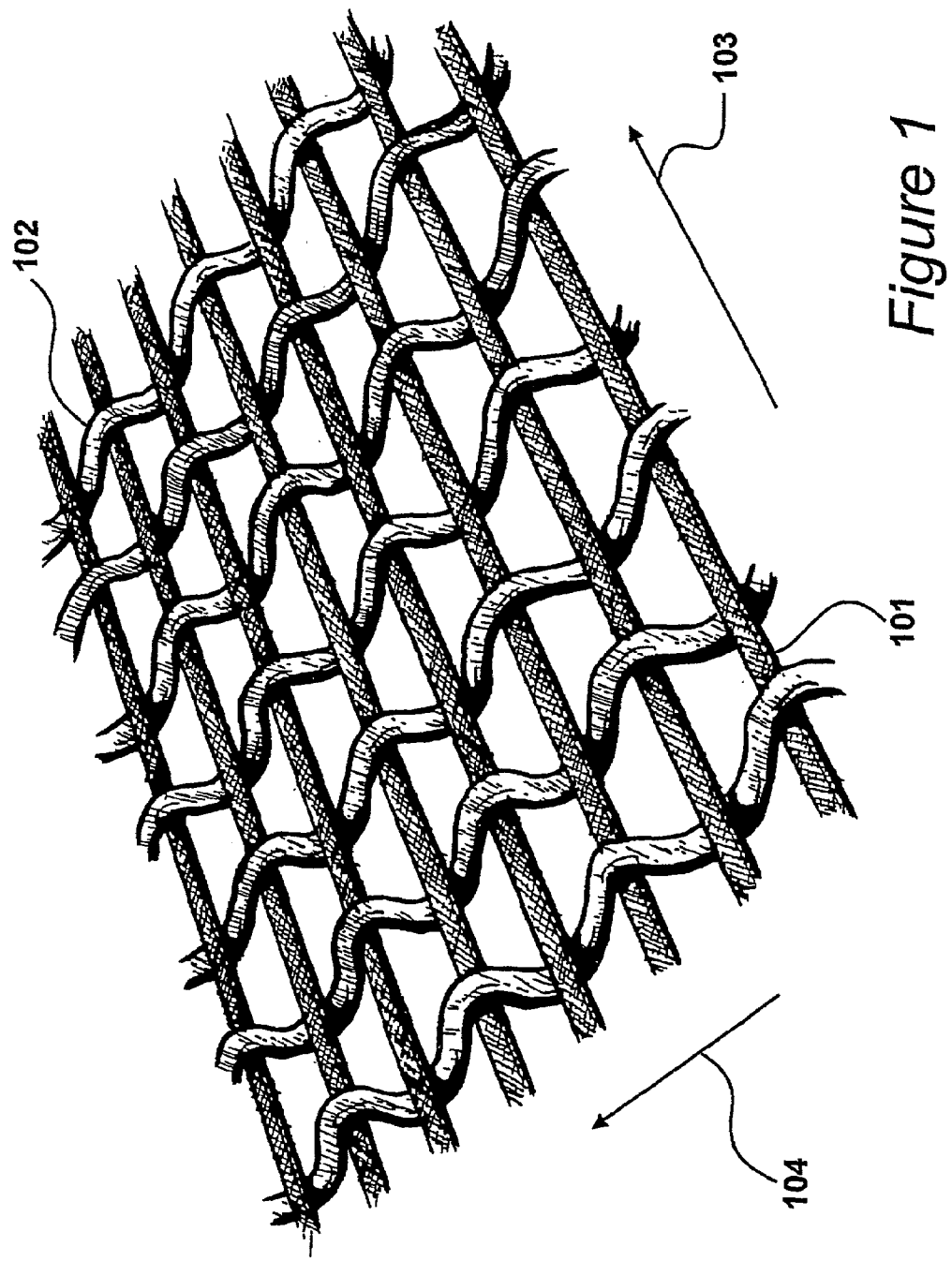
FIG. 1 shows a woven fabric of a type suitable for application in a detector.

A woven fabric is shown in FIG. 1 of a type suitable for application in a detector made in accordance with the present invention. The woven fabric has a warp made from single filaments of carbon coated nylon-6, available from BASF under the trademark "RESISTAT" and identified by the designation F901. F901 is a fibre produced primarily for use in static dissipation applications in fabrics. Many different sizes of filament may be employed, dependant upon the requirements of an application, and in this example the size of the filaments is twenty-four decitex, (twenty-four grams per 10,000 m) presenting a diameter of fifty-two micrometers.

Weft fibres 102 are fabricated from a polyester yarn of similar dimensions to the warp. These polyester weft yarns are non-conductive such that the resulting fabric is conductive along the warp, in direction 103 but not conductive in the orthogonal weft direction, as illustrated by arrow 104. Thus, due to the nature of the weave of the material, each conductive warp yarn 101 is separated from adjacent conductive yarns, even when flexed, due to the undulating nature of the weft yarn 102. Thus, the fabric is composed of a plurality of lengths of conductive yarn and a plurality of lengths of insulating yarn, such that each length of conducting yarn is electrically isolated from adjacent lengths of conducting yarn.

As used herein, a yarn should be understood to include a spun thread having many fibres or a continuous fibre, possibly extruded from plastic etc. Thus, in this example, each length of the warp yarns is a continuous thread whereas the wefts 102 are spun from a plurality of threads.

Figure 1A:
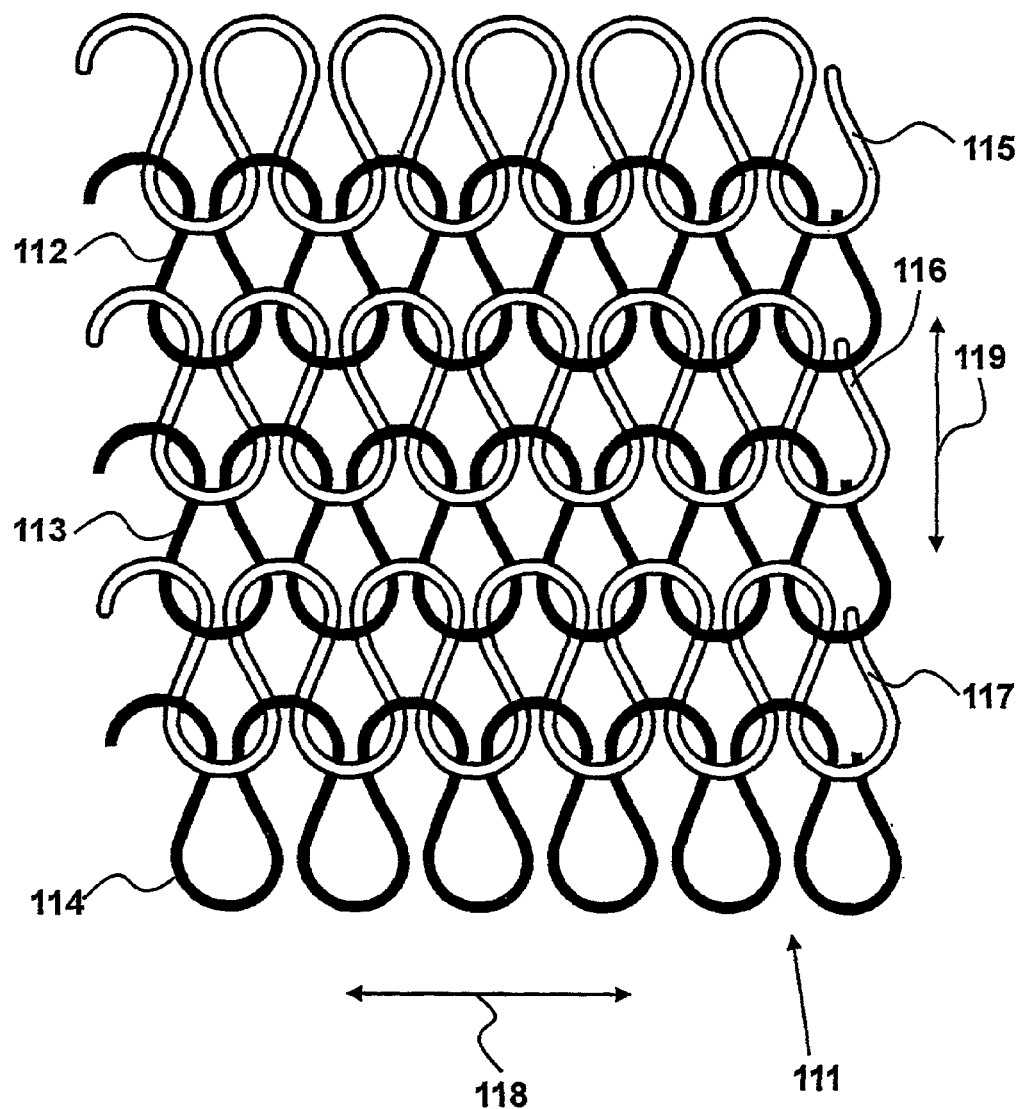
FIG. 1A shows an alternative to the fabric of FIG. 1, produced by a knitting process.

An alternative to the fabric of FIG. 1 is shown in FIG. 1A. FIG. 1A provides a detailed view of a fabric 111 produced by a knitting process. Such a construction may be achieved by using either a warp knit or a weft knit process. The knitted fabric 111 is produced by knitting together lengths of conductive yarn 112, 113, 114 and lengths of non-conducting yarn 115, 116, 117 in a machining process. Therefore, in a similar manner to the fabric of FIG. 1, the fabric of FIG. 2 contains lengths of conducting yarn (eg 113) that are electrically isolated from adjacent conducting yarn (eg 112 and 114) by non-conducting yarn (eg 116 and 117).

The knitted fabric thus provides a layer having electrical conductivity in one direction along the layer, indicated by arrow 118, which is defined by the alternating conductive and non-conductive yarn.

FIG. 2

Figure 2:
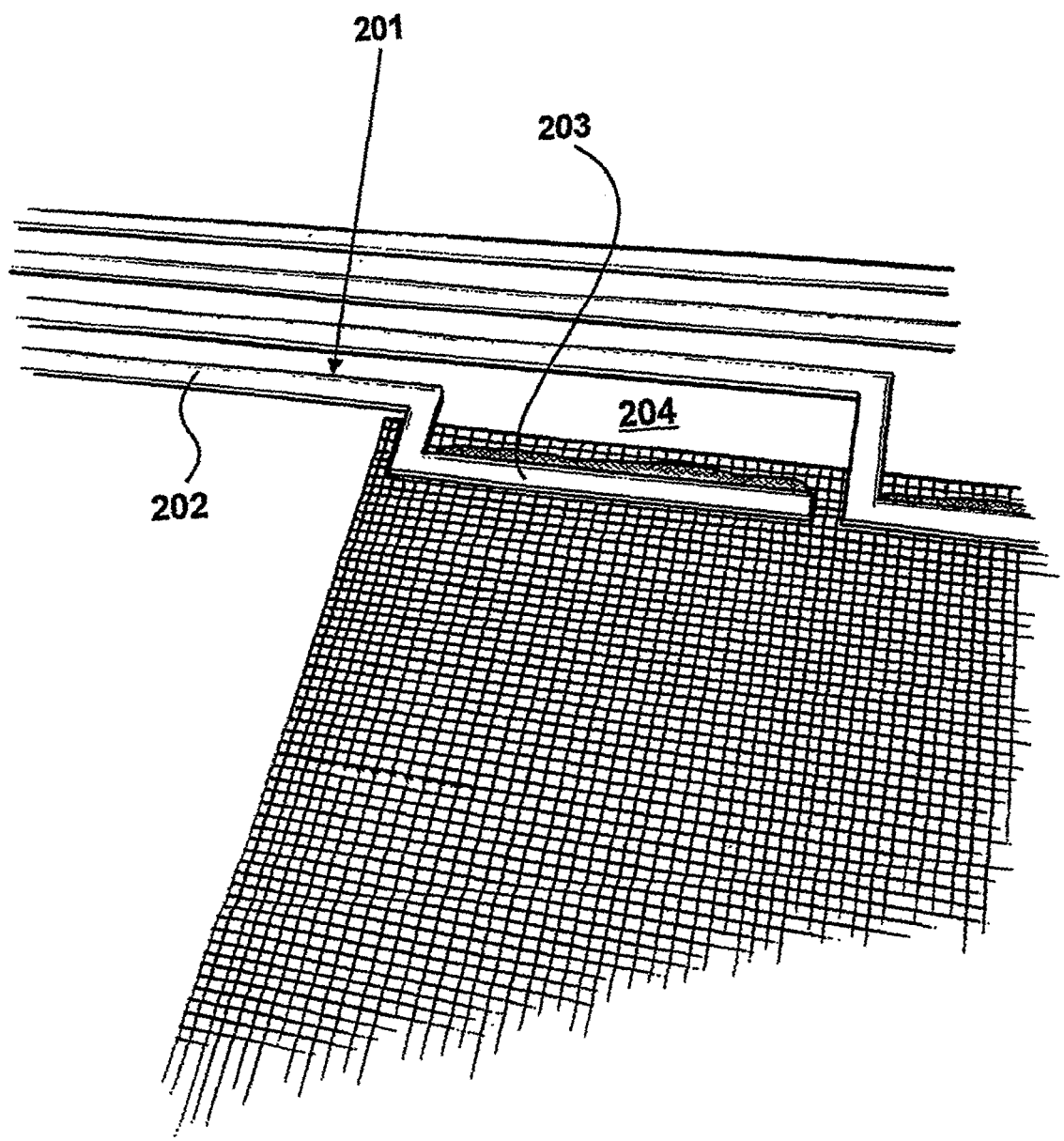
FIG. 2 shows a plurality of warp filaments grouped together by a conductive track.

In the construction of a detector, a plurality of lengths of conductive yarn are selected for electrical connection to a conductive track. Therefore, a plurality of warp yarns, of the fabric of FIG. 1, are electrically connected to a conductive track, as shown in FIG. 2. In the weaving of fabric of the type shown in FIG. 1, the warp threads are not physically grouped and no additional processes need to be performed to the general weaving process. The grouping is only defined by the electrical connection. In the embodiment shown in FIG. 2, all warp threads within a group are electrically connected such that, at a boundary, a warp thread will be connected to a particular electrical connector with the adjacent thread being connected to a different connector; it being noted that adjacent warp threads are electrically insulated from each other by the non-conducting weft threads. However, in an alternative embodiment, non-conductive warp threads could be introduced at group boundaries or gaps may be introduced such that some of the warp threads remain unconnected to an electrical connector. However, advantages in terms of continuity exist if all of the threads are electrically connected, particularly if the device is to be used as a single conductive layer (with the individual connectors being electrically connected together) so as to minimise the introduction of discontinuities.

Conductive track 201 has a conduction portion 202 and a attachment portion 203. The attachment portion 203 makes physical and electrical contact with a set of conducting warp filaments 101. The conduction portion 202 facilitates electrical connection to external devices. The conducting tracks 201 are applied to the conductive material and an insulating substrate 204 by a printing process, using a conductive ink such as that normally used in flexible printed circuit manufacture. Alternatively the conducting tracks may be fabricated from a highly conductive material, possibly fabricated exclusively from conductive filaments, and then attached to the substrate material and the conducting material by means of a conductive adhesive, such as conductive acrylic adhesive containing metallised particles. Alternatively, the conducting tracks may be fabricated from fabric coated with conductive metals, such as silver or nickel. Material of this type is readily available and is used extensively for shielding equipment from electromagnetic interference. This too may be used in conjunction with a conductive adhesive.

FIG. 3

Figure 3:
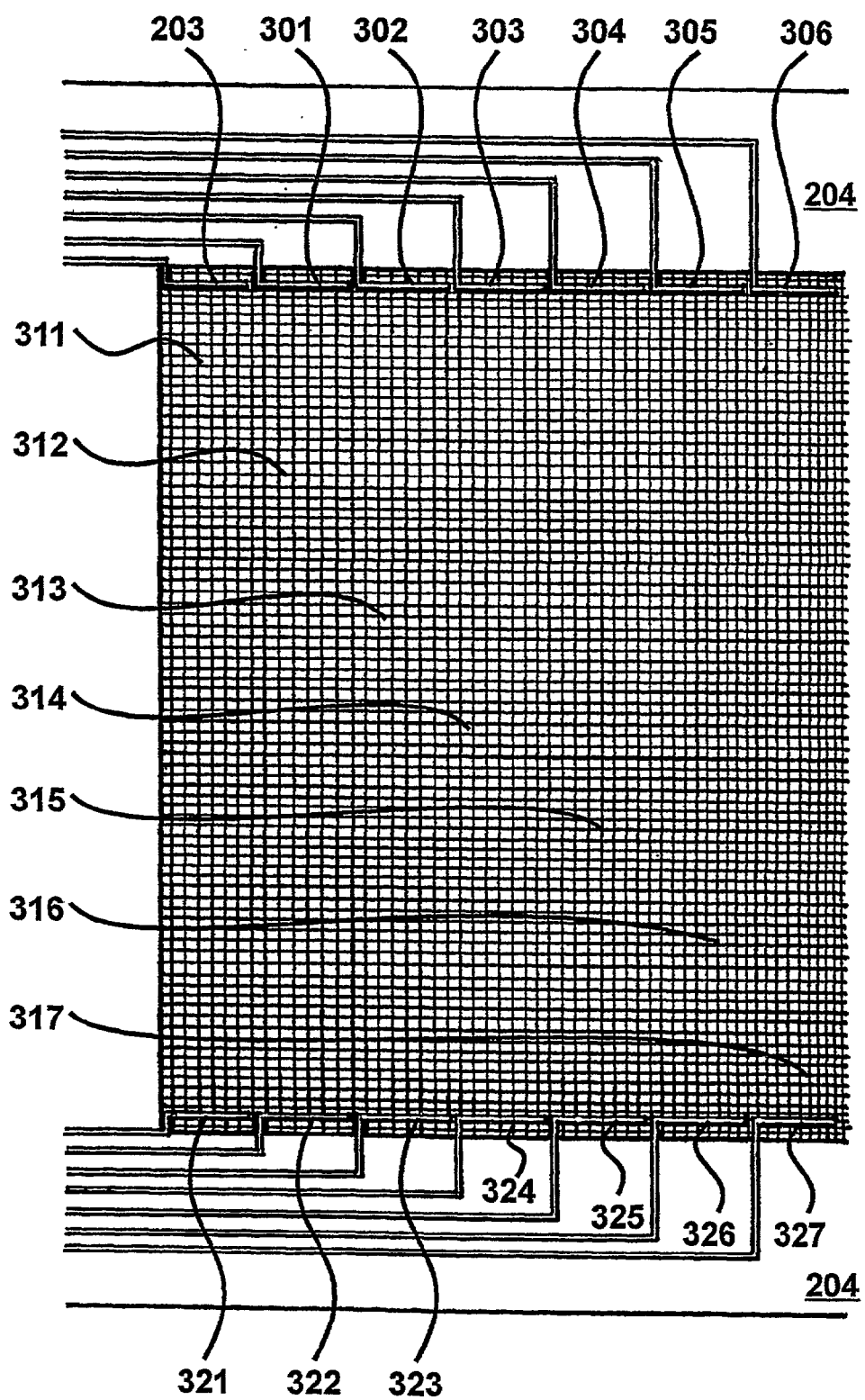
FIG. 3 illustrates an example of a sheet fabricated using the technique illustrated in FIG. 2.

Conductive track 201 represents one of many similar conductive tracks present within a fabricated sheet, of the type illustrated in FIG. 3. In the example shown in FIG. 3, seven attachment portions 203 and 301 to 306 are present each having respective conducting tracks printed or glued to substrate 204. In this way, there is provided seven conducting bands 311 to 317, with the material having a similar arrangement of attachment portions 321 to 327 at its opposite end. Thus, in this way, it is possible for an electrical current to flow through each of the conductive bands 311 to 317, without conduction being made possible between the bands given that the material is not conductive in the orthogonal direction, that is along the direction of the wefts. The precise number of electrical connections formed to the fabric sheet may be varied from that shown in FIG. 3 depending on the type of detection device required.

In some applications, it is only necessary for the conductive warp threads to be connected at one end, given that a particular area may be identified by conduction through to a similar sheet, thereby identifying a particular row/column position. However, an advantage of providing electrical connections at both ends is that a voltage gradient may be applied across the layer and an accurate position within a particular region may be detected by measuring specific voltages. Furthermore, it is also possible for other properties of a mechanical interaction to be detected by measuring other electrical properties such as the degree of current flow.

FIG. 4

Figure 4:
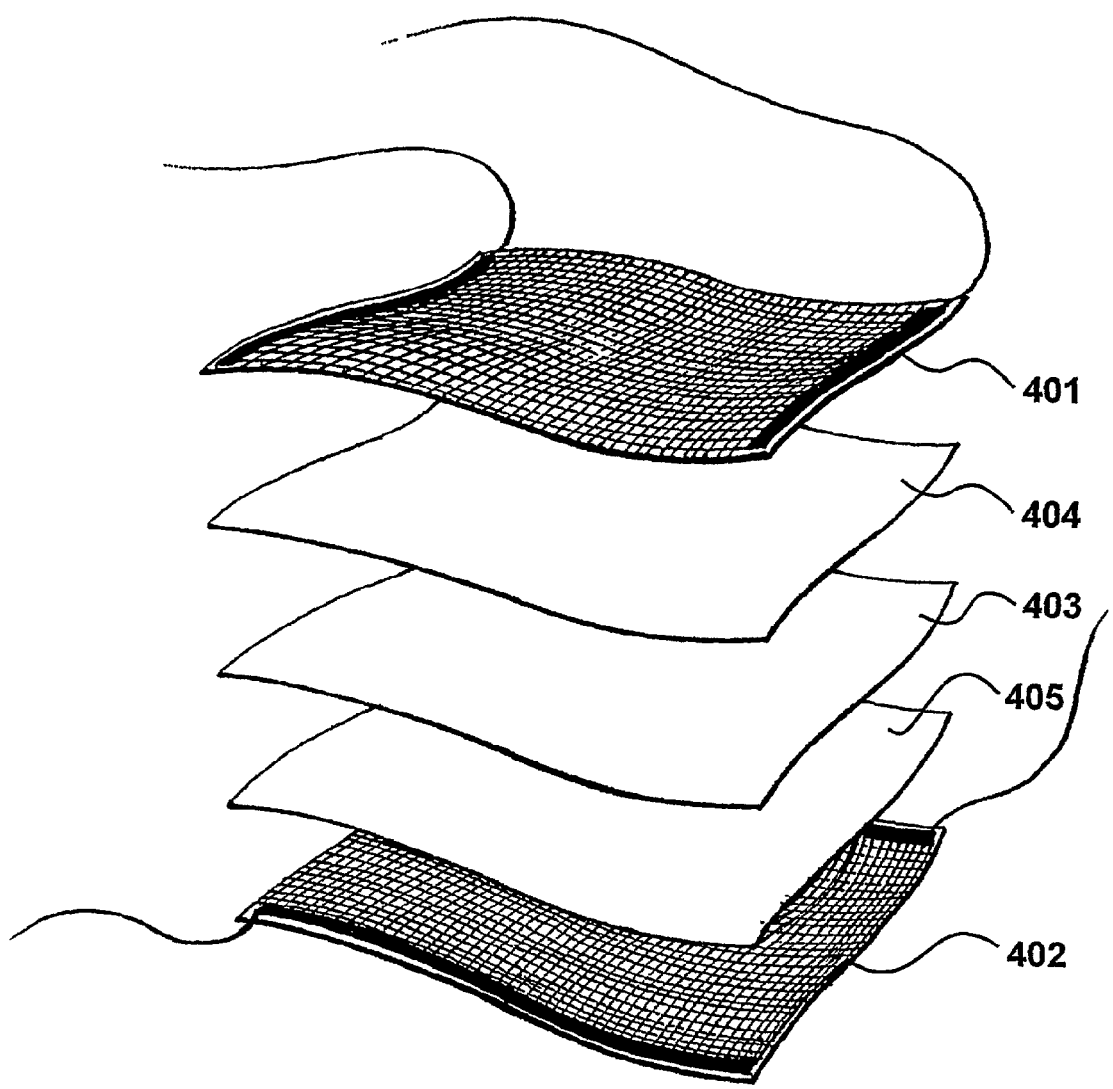
FIG. 4 shows use of the material identified in FIG. 3 for the manufacture of a five layer device.

The fabricated material layer shown in FIG. 3 forms part of the five layer device of the type shown in FIG. 4. The layer illustrated in FIG. 3 represents a top layer 401 of the five layer device illustrated in FIG. 4. A similar layer is used for a bottom layer 402 where the construction is rotated through ninety degrees. Thus, the conductive regions 311 to 317 in top layer 401 present a plurality of conductive rows, with similar layer 402 presenting a plurality of conducting columns. In this way, specific regions (forty-nine in this example) may be identified within the device as being in a particular row in sheet 401 and in a particular column in sheet 402. Furthermore, a mechanical interaction, such as a finger press or other compression, may result in a current flow within a particular area between conductive layers 401 and 402.

The five layer device is completed by a central conductive layer 403 and intermediate insulating layers 404, 405. The central conductive layer 403 is constructed by knitting a polyester yarn of twenty-four decitex filaments having a single conductive filament twisted therein, such that the conductive filament appears relatively randomly in the completed knitted product. In addition, the central conductive layer 403 has a conductance perpendicular to the plane of the device (in the z axis) that increases as it is placed into pressure thereby facilitating conduction between the layers during a mechanical interaction.

The insulating layers 404 and 405 are woven or knitted with a relatively wide spacing so as to ensure that the conductive layers are separated while at the same time allowing conduction to take place when mechanical pressure is applied. The presence of these insulating layers ensures that the overall construction may be folded and flexed or wrapped around objects without causing the two conductive layers to be brought into contact and thereby producing an erroneous contact identification.

In an alternative embodiment, it is possible to fabricate a device using three layers, effectively removing layers 404 and 405. To achieve this, conducting layers 401 and 402, or the central conductive layer 403, are fabricated in a way such that portions of the non-conducting fibres stand proud of the conducting fibres, thereby effectively introducing a degree of insulation in the z direction. This may be achieved by using weft fibres having a larger dimension than the warp fibres or alternatively by introducing other ways of making the weft fibres stand proud.

In a further alternative embodiment, the device is fabricated with only two layers 401 and 402. In a similar manner to the three layered device, the layers 401 and 402 are fabricated using conducting and non-conducting fibres, such that the non-conducting fibres stand proud of the conducting fibres. The conducting fibres are thus recessed within the layers. The resulting assembly has disadvantages in use, in being more prone to outputting erroneous signals when flexed or folded. This disadvantage is minimised by increasing the depth of the recessing of the conductive fibres in each layer. However, this in turn makes the device harder to activate at low pressures.

The advantage of such an assembly is in its simplicity of construction. In fact such an assembly can be produced in a single pass on a weaving loom in the form known as a "double cloth", where insulating weft and conducting warp form an upper portion of the fabric, and a conducting weft and an insulating warp form a lower half of the fabric. The two portions are periodically attached by the inclusion of one of the insulating yarns from either portion, in the other portion. Insulating substrate material and conducting tracks are then applied onto the outside of the resulting fabric to complete the assembly.

FIG. 5

Figure 5:
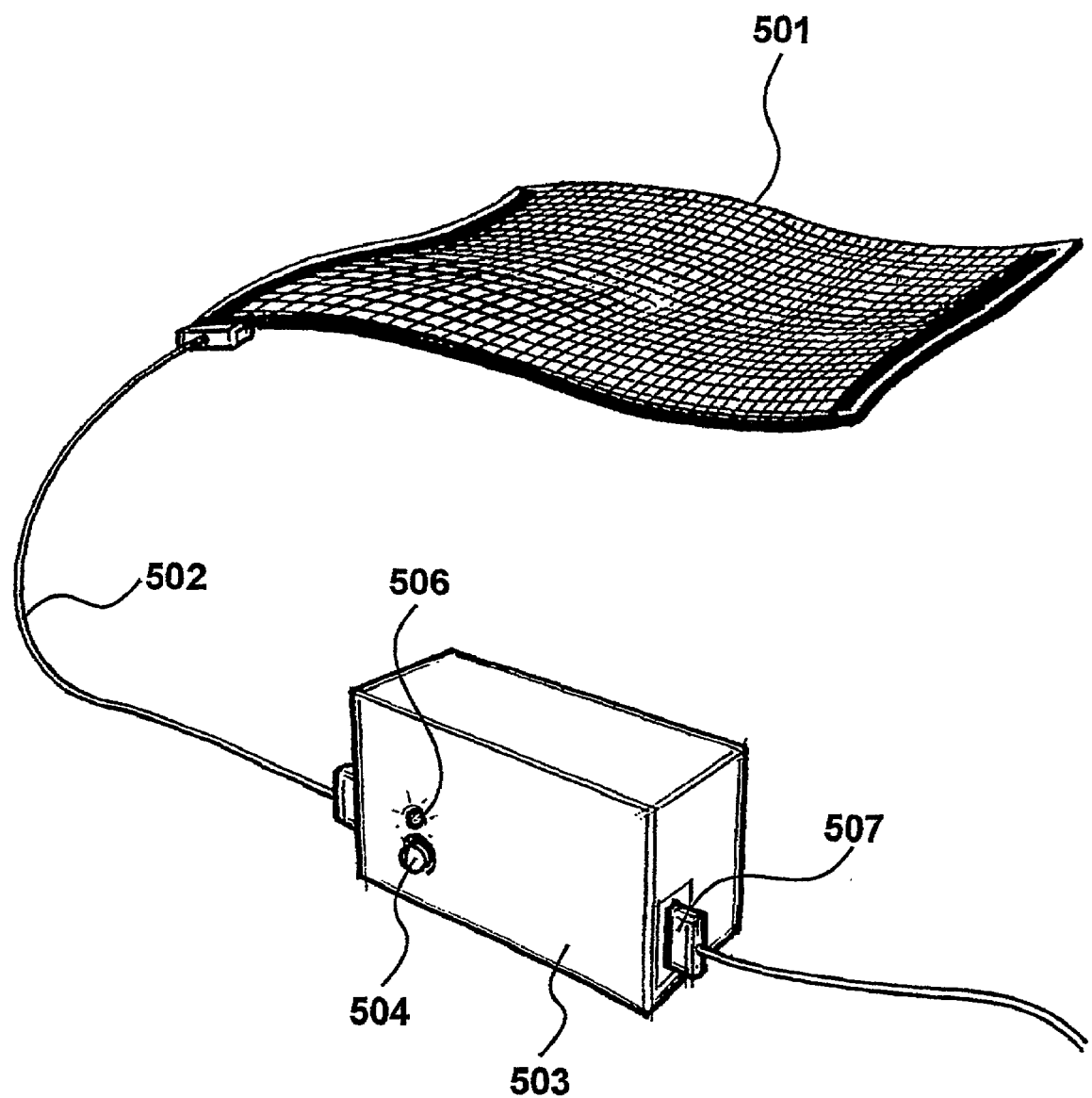
FIG. 5 shows an assembled device of the type shown in FIG. 4.

Conducting tracks, such as track 201, are covered by an insulating adhesive tape or alternatively by a printed insulating material. The layers shown in FIG. 4 are then assembled together, by a sewing operation, or alternatively by lamination, to form an assembled detection device 501 as shown in FIG. 5. Wires are attached to the ends of the electrical track and then assembled together in the form of a cable 502 connecting the fabric device 501 to an interface device 503. Interface device 503 includes a power switch 504 and a mode selection switch 506. In addition, the interface device 503 includes an output socket 507 by which outputs generated by the interface device are transmitted to a further processor and/or a visual display unit. In response to a mode of operation selected by mode selection switch 506, the output socket 507 provides an output representative of mechanical interactions occurring on the detector 501.

Physically, the detector 501 appears to be a continuous sheet, without discontinuities. However, given the arrangement of electrical connectors, the sheet is effectively divided into a plurality of regions, a total of forty-nine in this example but the actual number present in any implementation is determined by the ultimate function that the detector is to perform.

In a first mode of operation, selected by switch 506, the detector operates in a substantially digital manner providing an indication as to whether a mechanical interaction has occurred at any particular region. Such a mode of operation, for example, facilitates an application in which the pressing of buttons is being detected.

In a second mode of operation, selected by switch 506, it is possible to identify which region is undergoing a mechanical interaction and it is also possible to provide additional information about that interaction, such as the pressure of the interaction.

In a third mode of operation, it is possible to identify which region is undergoing a mechanical interaction and to provide additional information about that interaction, such as the pressure of the interaction, but it is also possible to locate the position of the interaction to a location within an identified region.

In a fourth mode of operation, the electrical connectors are effectively connected together such that the detector behaves as a single pressure sensitive sheet using analogue voltage variations to determine positions within the detector and current variations to determine the extent of the interaction. Under this mode of operation individual regions do not form part of the operational characteristic.

The interface device 503 is capable of performing the above modes of operation either by manual selection using the mode selection switch 506, or by preprogramming or automatically selecting a mode of operation.

FIG. 6

Figure 6:
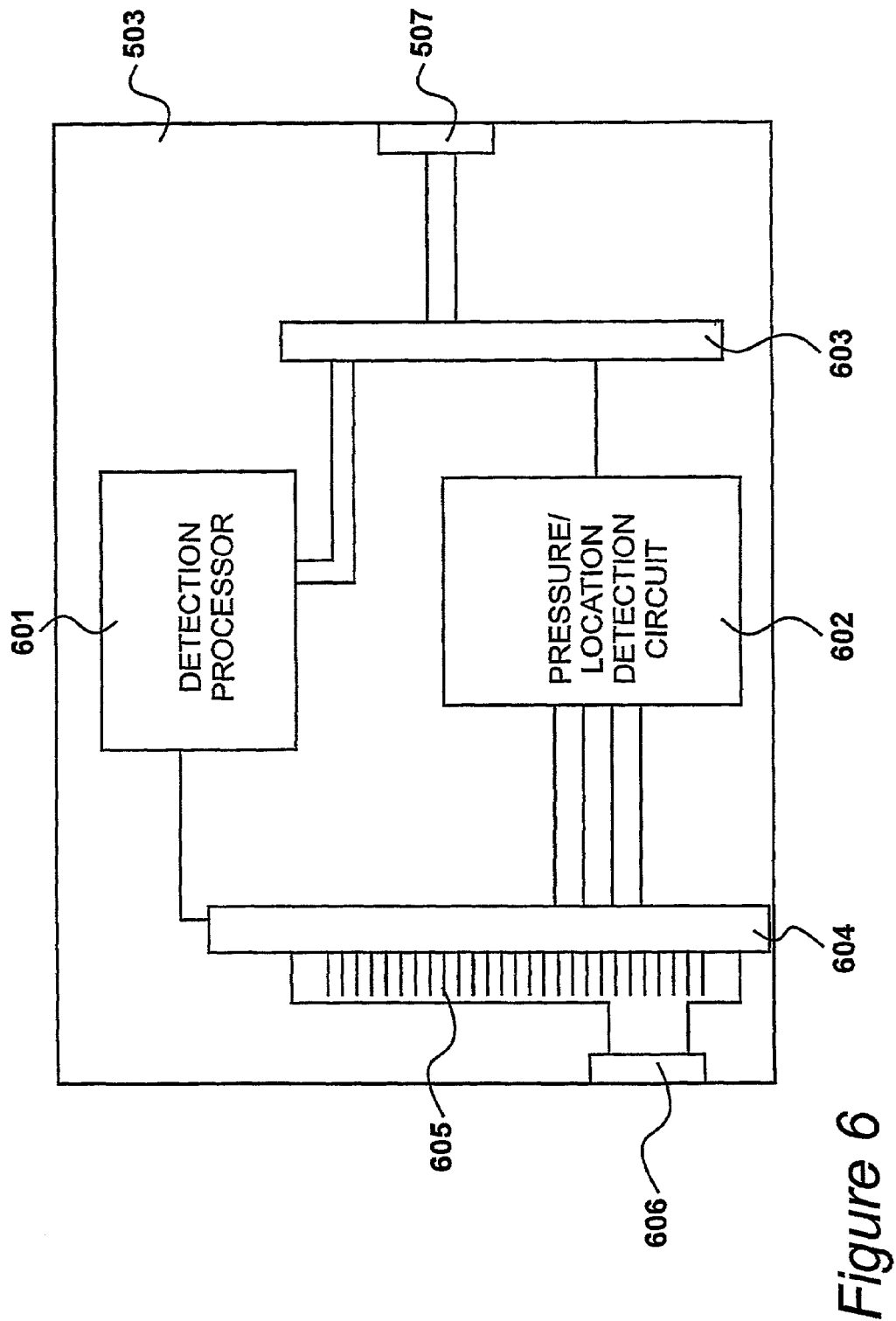
FIG. 6 details an interface circuit for connection to the detection device shown in FIG. 5.

Interface device 503 is detailed in FIG. 6. In addition to an output socket 507, the interface device includes a detection processor 601, a pressure/location detection circuit 602, a switching circuit 603, a multiplexing switch 604 having electrical connection input elements 605, and an input socket 606. Each of the seven conductive columns in layer 402 and each of the seven conductive rows in layer 401 has two wires associated therewith, therefore in this embodiment with forty-nine regions, there is a total of twenty-eight individual wires restrained within cable 502. These wires are received by input socket 606 and are then fed individually to the electrical connection input elements 605 of multiplexing switch 604. Multiplexing switch 604, under the control of detection processor 601, cyclically selects groups of four inputs during mode one, mode two or mode three operation, effectively resulting in a periodic scan of the forty-nine detector regions. The four inputs selected by multiplexing switch 604 are supplied to the pressure/location detection circuit 602 which, dependant upon the position of selection switch 506, operates to obtain readings from the detector 501. In mode four operation the multiplexing switch 604 connects all similar lines in parallel to present four lines to the location/detection circuit 602 relating to the whole of the device; with no cyclical operation between regions being performed.

When location detection is being performed, (mode one) it is only necessary for multiplexing switch 604 to connect a single connection from upper sheet 401 and a single connection from lower sheet 402 to pressure/location detection circuit 602, at any one time. If, on viewing these two terminals, an open circuit is present (indicating that no current is flowing from the upper sheet 401 to the lower sheet 402), no mechanical interaction has occurred at the region under consideration. Alternatively, if a closed circuit is identified and current is flowing from the upper sheet 401 to the lower sheet 402, this can be represented as a mechanical interaction and an output to this effect is supplied to switching circuit 603 which in turn conveys this information to the detection processor 601 and to output socket 507. The detection processor 601 is therefore controlling the multiplexing operation and is then in a position to compare the configuration of the electrical connections formed to the detector with the resulting output from within a given region. Consequently, an output is constructed by the detection processor 601 showing a representation of the detector with indications as to where a detected mechanical interaction has taken place.

In modes two, three and four, information relating to pressure detection at individual regions (modes two and three) or pressure detection values for the whole of the detector (mode four) are also obtained by the pressure/location detection circuit 602 and supplied to the switching circuit 603 which in turn conveys this information to the detection processor 601 and finally to the output socket 507. Output information is conveyed to a further processor and/or a display apparatus which produces a visual representation in response to the outputs received from the interface device 503. The nature of the visual representation will be more complex for mode two, three and four operation compared to that required to illustrate mode one operation.

In mode two and mode three operation, multiplexing switch 604, under the control of detection processor 601, cyclically selects groups of four inputs, effectively resulting in a periodic scan of the forty-nine detector regions. The four inputs correspond to two pairs of attachment portions, such that each pair corresponds to one of the conductive bands. The four inputs selected by multiplexing switch 604 are supplied to the pressure/location detection circuit 602.

In mode two, the pressure/location detection circuit 602 provides a pressure detection value to the detection processor 601 via switching circuit 603. In mode three; the pressure detection circuit provides the display processor 601 with a pressure detection value and also X and Y positional co-ordinate data relating to the position of mechanical interaction within the region being addressed.

In mode four operation, the conductive portions on each of the edges of layer 401 or 402 are electrically connected. For example, conductive portions 321 to 327 (as shown in FIG. 3) are electrically connected by the multiplexing switch 604 and provide one of the four inputs to the pressure/location detection circuit 602. The other three inputs are connected to the conductive portions corresponding to the other three such edges. The pressure/location detection circuit 602 detects pressure applied to the device 501 by a mechanical interaction and also the X and Y position of the mechanical interaction. Corresponding pressure and positional values are supplied by the pressure detection circuit to the switching circuit 603 and so to the detection processor 601.

In modes one, two and three, the provision of a plurality of regions, each of which may independently provide information relating to a respective mechanical interaction via circuit 602, allows the device to be used in many applications where a single interaction detector would not be suitable. Firstly, it would be possible to provide a detector with graphical icons or buttons printed thereon which are then responsive to manual finger presses, in a situation where more than one finger press may be made; this exploits the provision of the mode one location detection operation operated by the location detection circuit 602.

In another application, exploiting the pressure detection capability, it is possible to map degrees of pressure applied to each of the specific regions. This application is particularly useful when considering personal support appliances, such and beds. In one example, a device is used as a mattress cover for patients susceptible to pressure ulcers. A display device connected to the device provides an indication of areas where excessive pressure is being applied to the mattress and can also monitor movement of the occupant over time, such that the healthcare professionals may take appropriate action and thereby reduce further complications.

FIG. 7

Figure 7:
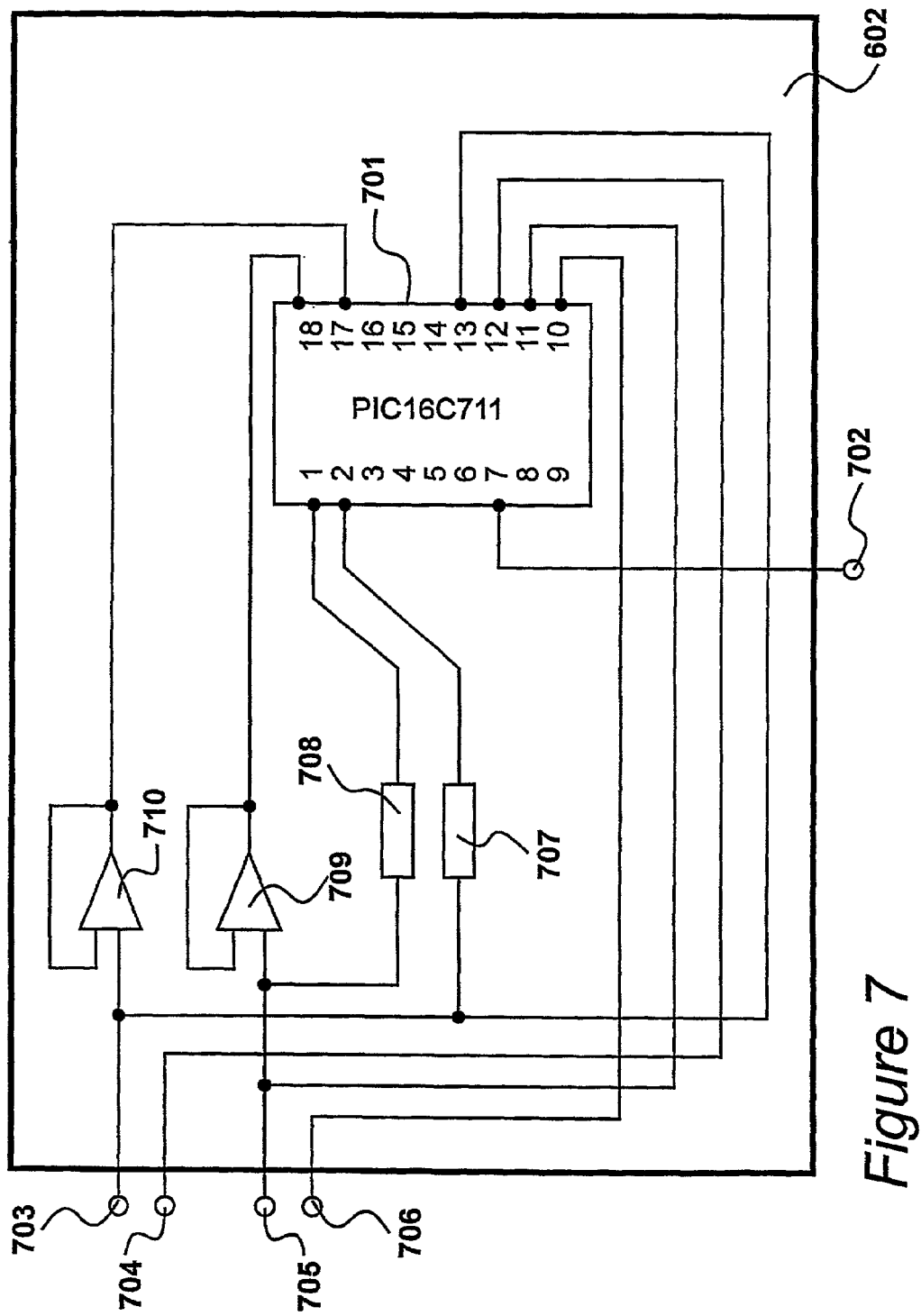
FIG. 7 details an example of a pressure/location detection circuit that is incorporated into the interface circuit of FIG. 6.

The location/pressure detection circuit 602 is detailed in FIG. 7. The location detection circuit comprises a peripheral interface controller 701 which is connected to a serial communication output 702 and electrical connections 703, 704, 705 and 706 configured to supply and receive the necessary voltages via the multiplex switch 604.

The peripheral interface controller (PIC) 701 is a programmable controller of the type PIC16C711. The PIC 701 operates under the control of a programme which controls the parameters of the detector which the pressure/location circuit 602 is configured to measure or detect. Parameters under investigation will depend upon which mode of operation is selected and will be discussed further in reference to FIGS. 8 to 12.

Under control of the PIC 701, and dependant on the mode of operation, the necessary output voltages can be supplied to electrical connections 703, 704, 705 and 706 via pins one, two, ten, eleven, twelve and thirteen of the PIC. The PIC includes an analogue to digital converter which is used to process analogue voltages received at pins seventeen and eighteen. The input pins seventeen and eighteen receive outputs from high impedance buffers 709 and 710 respectively. The buffers 709 and 710 are half of unity gain operational amplifiers of the type TL062, and provide a high impedance buffer between the sensor output voltages and the PIC 701 input ports.

Connection to pins one and two occurs via resistors 708 and 707 respectively. Resistors 708 and 707 are selected according to the resistance of the detector as measured from a connector attached to one fabric layer 401 to a connector attached to the second fabric layer 402 while a typical mechanical interaction pressure is applied to the corresponding area of the detector under investigation. A value of 10 Kohms is typical for resistors 708 and 707.

The PIC 701 has an external crystal oscillator (not shown) running at 4 MHz connected across pins fifteen and sixteen. Positive five volts is supplied to pin fourteen and ground is connected to pin five. Pin four (the internal reset input) is held at positive five volts via a series resistor of 100 ohms.

The program running on the PIC 701 will determine the operational mode of the interface device 503 and determine the output measured by pressure/location detection circuit 602 within a region of the detector selected by the multiplex switch 604.

The four modes of operation of the interface device 503 have already been referred to. A mechanical interaction results in the initiation of current flow from the first electrically conductive layer 401 to the second electrically conductive layer 402. Accordingly, all four modes of operation require the detection of a pressure within a selected region of the detector. In mode one operation, the pressure/location detection circuit 602 provides an output indicating whether a pressure has been detected within a selected region of the detector. In modes two, three and four the pressure/location detection circuit 602 provides an output comprising a quantitative measure of the pressure detected within a selected region of the detector.

Figure 8A:
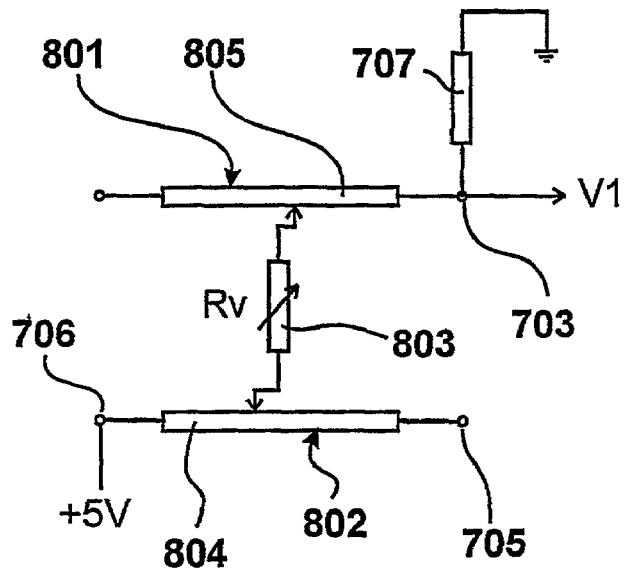
FIGS. 8A and 8B detail schematically the pressure measurements that can be made by the location/pressure detection circuit identified in FIG. 7.
Figure 8B:
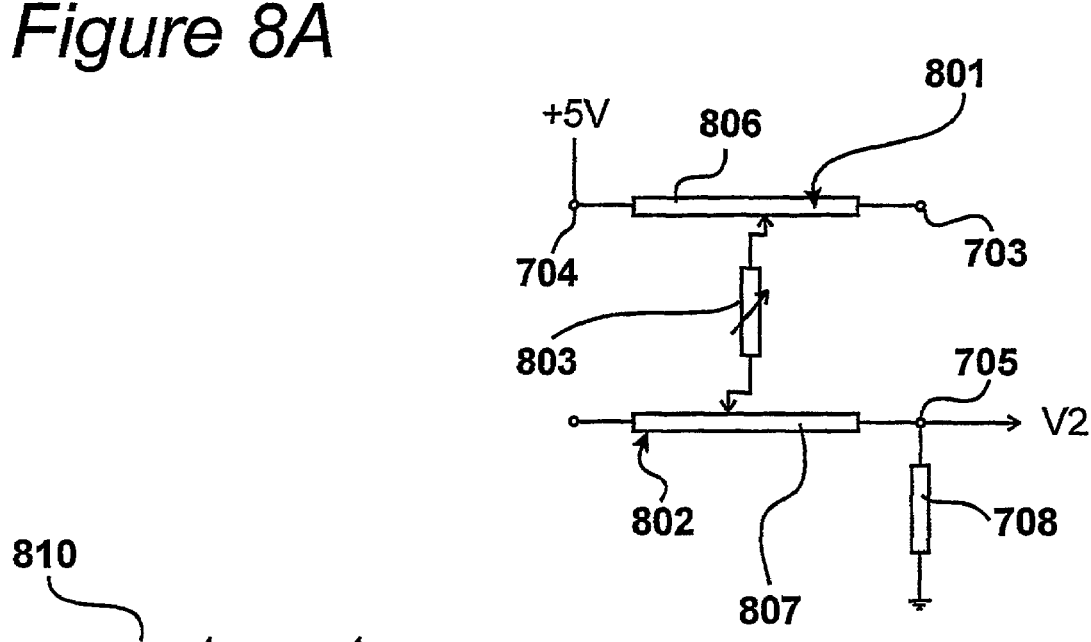

FIGS. 8A and 8B

A procedure for measuring the pressure and or area of a mechanical interaction is detailed in FIGS. 8A and 8B. An area of the conductive fabric layers 401 and 402 to which voltages are being supplied via multiplexing switch 604 are represented schematically by potentiometers 801 and 802 and the resistance of the conductive path between the outer layers at the location of the applied force is represented by variable resistor 803.

A first measurement of the pressure of a mechanical interaction is shown in FIG. 8A. Five volts are applied to connector 706, while connector 705 remains disconnected. Connector 703 is connected to ground via a resistor 707 of known value. Thus current flows from connector 706 through a first part of layer 402 as represented by a first part 804 of the potentiometer 802, through the conductive path indicated by variable resistor 803 having resistance Rv, through a first part of layer 401, indicated by a first part 805 of potentiometer 801 and through the known resistor 707. The voltage, V1 appearing at connector 703 is measured and since this is equal to the voltage drop across resistor 707, V1 is directly proportional to the current flowing from connector 706.

Since the resistances of parts 804 and 805 vary in relation to the mechanical interaction it is desirable to perform a second measurement of Rv. A second measurement of Rv can be performed as shown in FIG. 8B. Five volts are applied to connector 704, while connector 703 is disconnected. Connector 705 is connected to ground via a resistor 708 of known resistance. The voltage V2, dropped across resistor 708 is measured. Voltage V2 is directly proportional to the current flowing through a second part of layer 401 indicated by a second part 806 of potentiometer 801, through the conductive path indicated by variable resistor 803 having resistance Rv, through a second part of layer 402 indicated by a second part 807 of potentiometer 802 and through resistor 708.

The sum of the resistance of first part 805 and second part 806 of potentiometer 801 is approximately equal to the resistance between connector 704 and 703 on layer 801, and is therefore substantially constant during the measurements, since they occur in rapid succession. Similarly the sum of the resistance of first part 804 and second part 807 of potentiometer 802 is approximately equal to the resistance between connector 706 and 707 on layer 802, and is also substantially constant during the measurements. As a result, the relationship 810 exists between the resistance Rv, of the conductive path between the outer layers, and the measured voltages V1 and V2. i.e. the resistance Rv between the outer layers is proportional to the sum of the reciprocal of voltage V1 and the reciprocal of voltage V2. The voltages are used to calculate a Z value which is indicative of the pressure applied in the Z axis to the fabric planes.

Depending upon the type of sensor used the resistance Rv depends upon area of the applied pressure or a function of the area and the force as illustrated by relationship 811. Thus from the voltage measurements V1 and V2 an indication of the pressure with which the mechanical interaction is applied, or an indication of the area and the applied force may be determined.

FIG. 9

Figure 9:
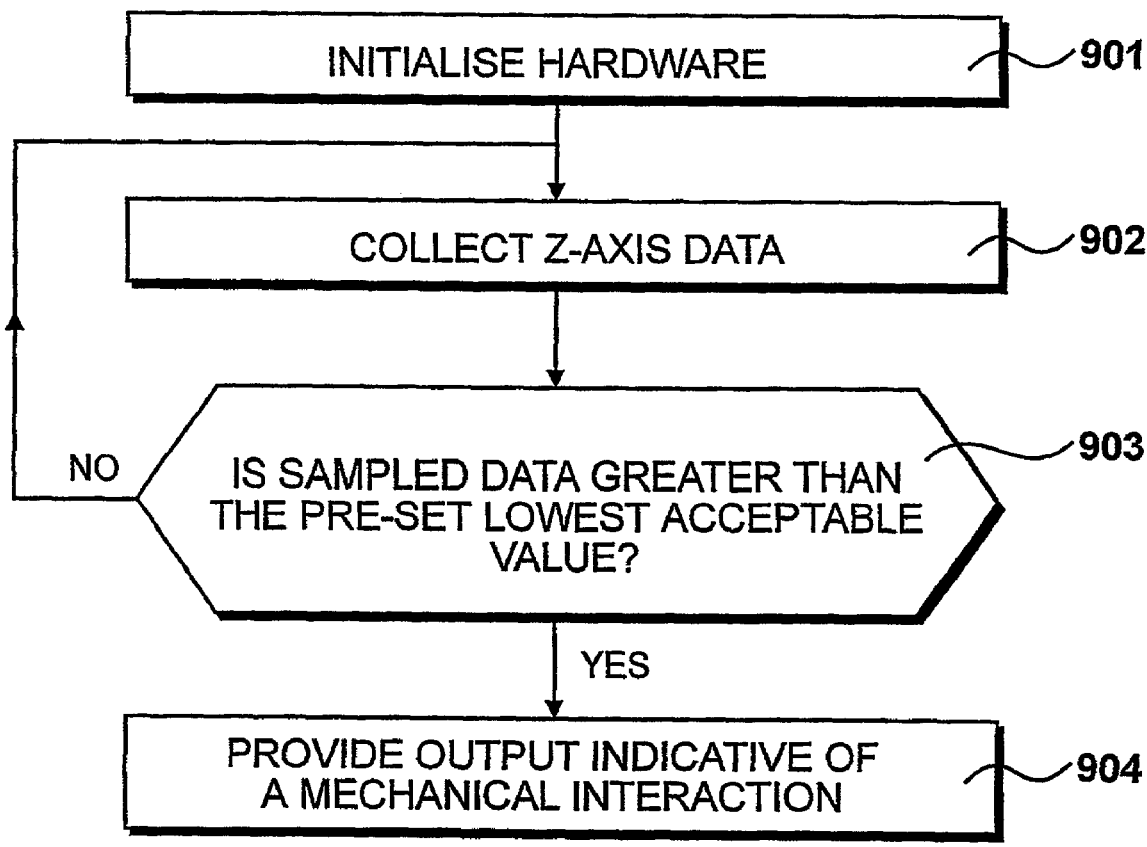
FIG. 9 is a flow chart illustrating a mode of operation performed by the PIC16C711 processor shown in FIG. 7.

An example of the program running on the PIC 701 of the pressure/location circuit 602 during mode one and two operation (where only pressure is determined) is detailed in FIG. 9. At step 901 the hardware is initialised and this process is detailed later in reference to FIG. 10. At step 902 the pressure/location detection circuit 602 measures values of voltages V1 and V2 (as described in reference to FIG. 8) and calculates a Z value of the interaction. The details of step 902 are described later with reference to FIG. 11. At step 903 a question is asked as to whether the Z data is greater than a predetermined value. If the answer to this question is no then the program returns to step 902. Thus the circuit measures Z values until a Z value greater than a predetermined value is detected. If the answer to the question at step 903 is yes then, in mode one operation, an output is produced that is indicative of a mechanical interaction at step 904. In mode two operation, the circuit measures the necessary voltages and calculates a Z value at step 904 and provides a quantitative output indicating the magnitude of the applied pressure.

Once an output has been provided, the program then returns to step 902 and looks for an indication of a further mechanical interaction. For example, in mode two operation, the multiplexing switch 604 under the control of detection processor 601 will configure the connections made to the detector so that a further area of the detector is subsequently selected and the pressure/location detection circuit 602 will monitor that further area for an indication of a mechanical interaction.

FIG. 10

Figure 10:
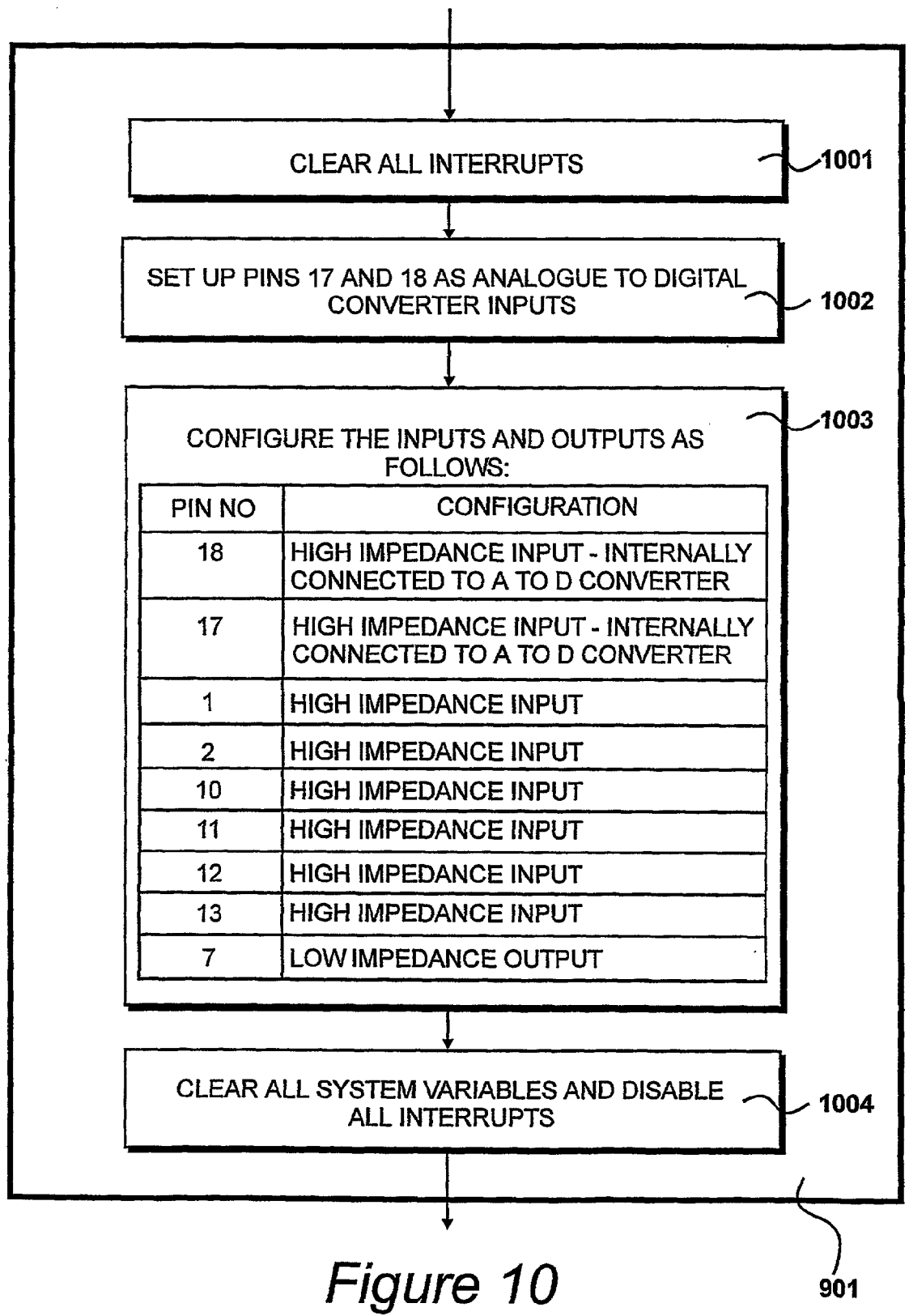
FIG. 10 is a flow chart detailing the initialisation procedure performed by the PIC16C711 processor shown in FIG. 7.

Step 901 of FIG. 9 is shown in further detail in FIG. 10. Within the initialisation step 901, at step 1001 the interrupts are cleared and then at step 1002 pins seventeen and eighteen are set up as analogue to digital converter inputs. The microports of a PIC16C711 may be configured as low impedance outputs or high impedance inputs. When in high impedance input mode, pins seventeen and eighteen can be programmed to connect via an internal multiplexer, to the analogue to digital converter. At step 1003 the ports which are to be used as inputs or outputs are configured in their initial state. At step 1004 all system variables are cleared and all interrupts are disabled.

FIG. 11

Figure 11:
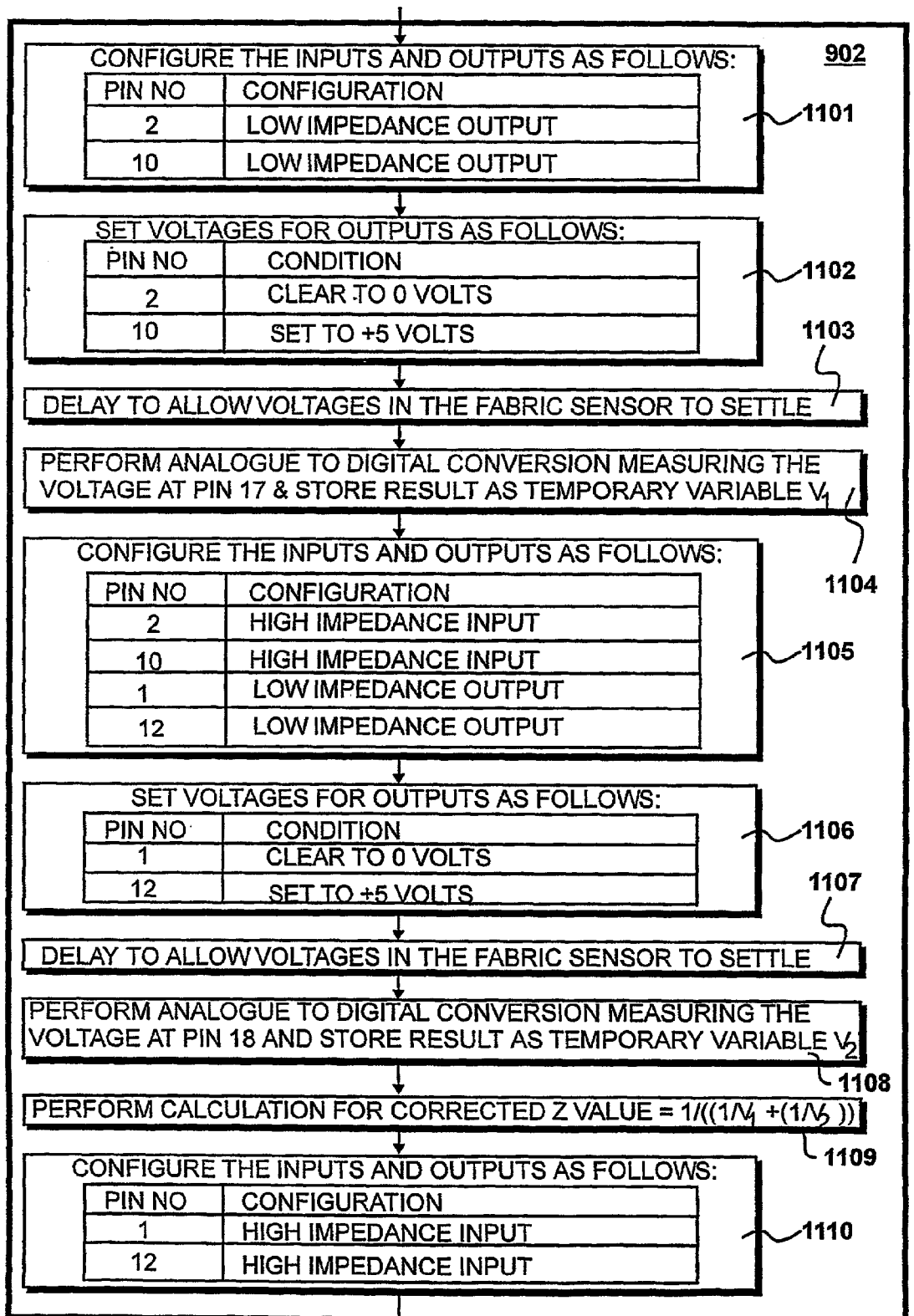
FIG. 11 is a further flow chart detailing the detailing the configurations of the PIC16C711 processor for the collection of Z value data as indicated in step 902 of FIG. 9.

Step 902 of FIG. 9 is shown in further detail in FIG. 11. Within step 902, at step 1101, the ports corresponding to pins two and ten are reconfigured as output ports and at step 1102 pin two is set to zero while pin ten is set to positive five volts. Thus connector 703 is grounded via resistor 707 and five volts are applied to connector 706. At step 1103 a time delay, (typically of two hundred and fifty microseconds in a sensor measuring one hundred millimeters by one millimeters with an outer layer resistance of 3.5 Kohms) is provided to allow voltages to settle before the voltage at pin seventeen is measured and stored as detailed in step 1104. Thus voltage V1 present at connector 703 is measured and stored.

At step 1105 pins two and ten are reconfigured as high impedance inputs while pins one and twelve are reconfigured as low impedance outputs. At step 1106 the voltages the voltages on pins one and twelve are set to zero and positive five volts respectively. Thus connector 705 is grounded via resistor 708 while five volts are supplied to connector 704. A suitable time delay, equivalent to that at step 1103, is provided at step 1107 before the voltage at pin eighteen is measured and stored at step 1108. Thus the voltage present on connector 705 is measured and stored as voltage V2. At step 1109 a Z value is calculated from stored voltages V1 and V2, and then stored. The pins one and twelve are reconfigured back to their initial state of high impedance inputs at step 1110.

During mode three operation, the circuit is configured to detect whether a mechanical interaction has occurred within a region and to provide a calculation as to the position of the mechanical interaction (i.e. the x and y positional co-ordinates of an interaction) within an area of the detector under investigation, in addition to calculating a further property of the mechanical interaction, such as pressure and/or area. Similarly, in mode four operation all the connections to the fabric planes 401 and 402 are connected so that the detector operates as a single pressure sensitive sheet. The x and y co-ordinates of a mechanical interaction oh the detector are determined by the pressure/location detection circuit 602 in addition to determining a Z co-ordinate value as necessitated by mode one and mode two operations.

Figure 12A:
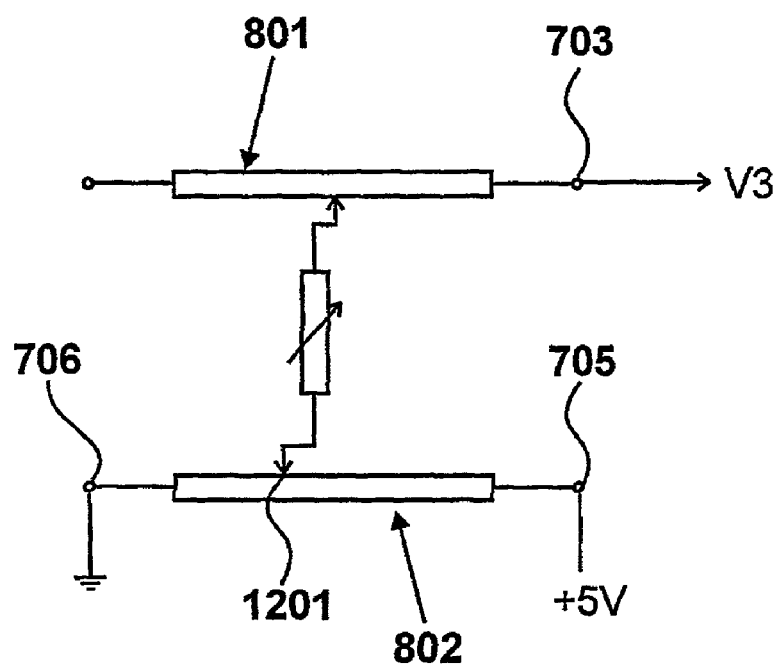
FIGS. 12A and 12B detail schematically the X and Y positional coordinate measurements that can be made by the location/pressure detection circuit identified in FIG. 7.
Figure 12B:
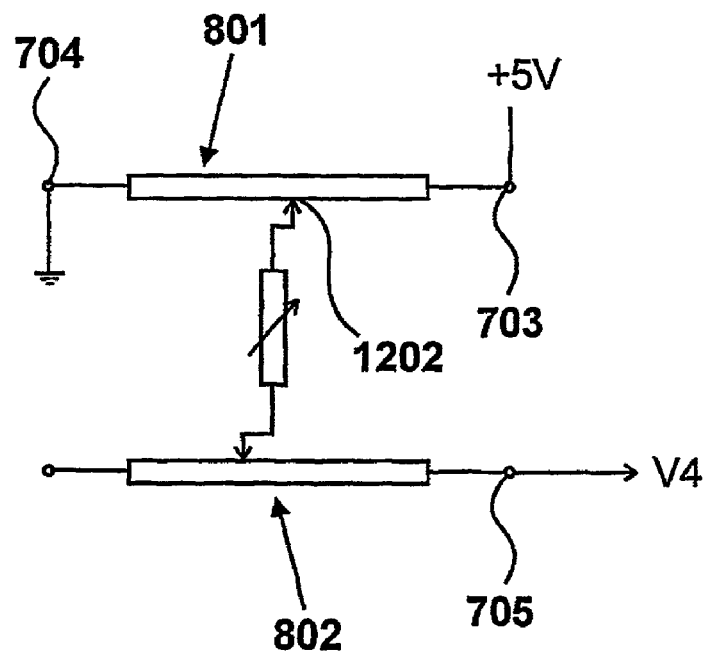

FIGS. 12A and 12B

A procedure for measuring pressure and/or area of a mechanical interaction (or Z axis data), is described in reference to FIGS. 8A and 8B. A procedure for determining the position of a mechanical interaction within an area of the detector under investigation is illustrated in FIGS. 12A and 12B.

FIG. 12A details the application of a voltage to an area of fabric layer 402 which is represented as potentiometer 802. The corresponding area of fabric sheet 401 selected to detect an output voltage or have a voltage applied thereto is represented by potentiometer 801. A first position measurement is made by applying a voltage of five volts to connector 705 whilst 706 is grounded. As a result a potential gradient is produced across layer 402. A voltage measurement is made at connector 703 using a high impedance device and so the voltage appearing on layer 401 at the position of the applied force 1201 is determined. This voltage, V3 is directly proportional to the distance of the centre of the applied force from the electrical contact connected to voltage input 706 and indicates its x axis position.

A further measurement is shown in FIG. 12B. Five volts are applied to connector 703 and connector 704 is grounded. A voltage measurement is made of voltage V4 appearing at connector 705. Voltage V4 is directly proportional to the distance of the centre of the applied force from the electrical contact connected to voltage input 704 and indicates its Y axis position shown at 1202. Therefore voltage V3 and V4 provide information as to the two dimensional position of the applied force on the sensor within the area of fabric sheets 401 and 402 under investigation, i.e. voltages V3 and V4 represent X and Y values for the centre of the position of the applied force.

FIG. 13

Figure 13:
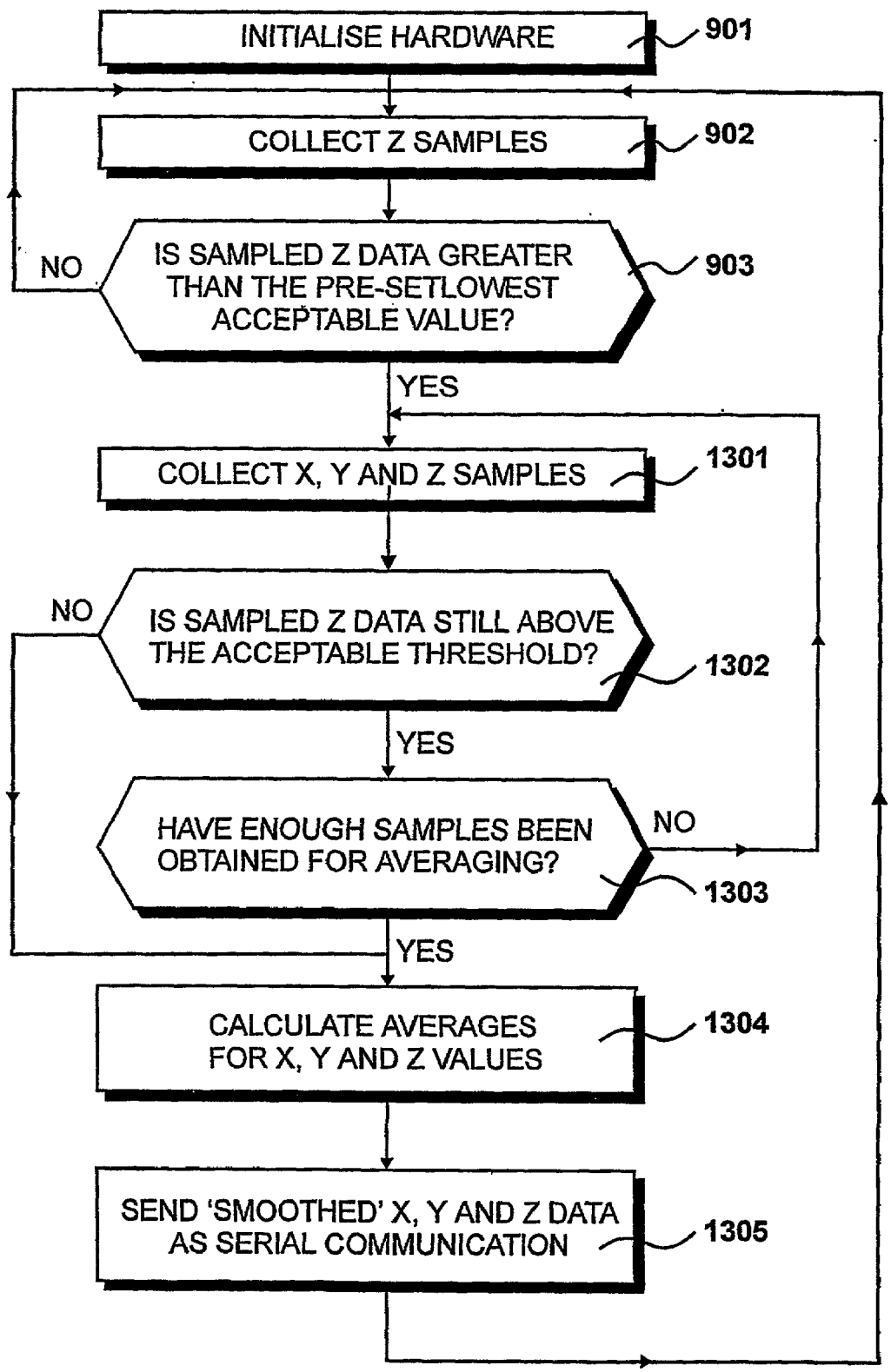
FIG. 13 is a flow chart detailing a further mode of operation of the PIC16C711 processor.

An example of a program that runs on the PIC 701 is shown in FIG. 13. Steps 901, 902 and 903 have already been described in reference to FIGS. 9, 10 and 11 as these steps are common to all four operational modes of the interface device 503. Accordingly, the PIC is programmed to collect Z data (step 902) and to determine whether the collected Z data is greater than the pre-set lowest acceptable threshold value (step 903). In mode three operation, if the answer to the question at step 903 is yes then the circuit measures voltages V1,V2,V3 and V4 (as described in reference to FIGS. 8 and 12) at step 1301. Step 1301 is described later in more detail with reference to FIG. 14. At step 1302 a question is asked as to whether the calculated Z value is still above the predetermined value. If the question is answered in the affirmative, a further question is asked at step 1303 as to whether enough samples have been obtained. Typically, between three and ten sets of samples are taken, with lower numbers of sets of samples being taken when a fast response time is required. If the answer to the question at step 1303 is no, then the program returns to step 1301 and a further set of measurements are made. When the answer to the question at step 1303 is yes, or when the answer to the question at step 1302 is no, then the program calculates average values of the samples of the voltages V3 and V4, and of the values of Z which have been collected. Thus, the program measures a predetermined number of voltages before finding the average values, or if the Z value drops below a predetermined value, the average values are calculated immediately. By using the average of a number of samples the effect of mains power electromagnetic interference or other such environmental noise may be minimised.

A simple calculation to find an 'average' value for say the X value, is to find the median of the maximum and minimum values of the stored values V3 i.e. a 'smoothed' value for X is found by adding the maximum stored value of V3 to the minimum stored value of V3 and dividing the result by two.

To further improve accuracy, values of X, Y, and Z that differ by a large amount from their immediately preceding and immediately subsequent values are excluded from the calculations of the average. In addition, known methods of eliminating mains electricity supply interference may be applied to the signals received from the sensor.

At step 1305 the averaged values for V3 and V4 representing XY positional co-ordinates and the averaged values of the Z data are output at the serial communication output 702. The program then returns to step 902 and looks for an indication of further mechanical interactions.

FIG. 14

Figure 14:
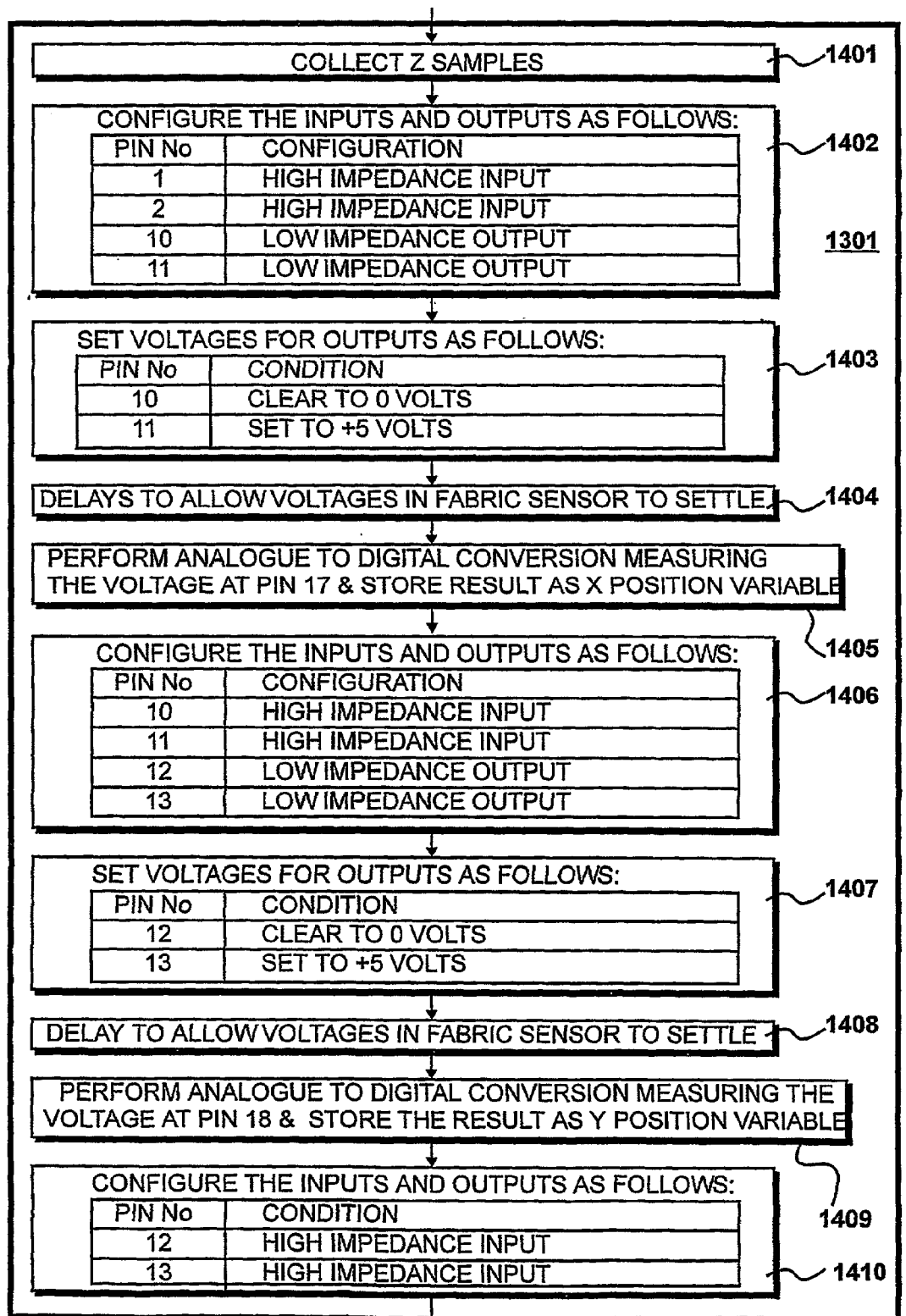
FIG. 14 is a flow chart detailing the configuration of the PIC16C711 processor for the collection of X, Y co-ordinate positional data and Z axis data as indicated in step 1301 of FIG. 13.

Step 1301 of FIG. 13 is shown in further detail in FIG. 14. Within step 1301, at step 1401 a Z value is collected in the same manner as at step 902. At step 1402 pins one and two are reconfigured as high impedance inputs and pins ten and eleven as low impedance outputs. At step 1403 pin ten is set to zero volts and pin eleven is set to positive five volts. Thus five volts are supplied to connector 705 while connector 706 is grounded. A delay is then provided at step 1404, (of typically one millisecond for a device measuring 100 mm by 100 mm) to allow voltages in the sensor to settle before the voltage on pin seventeen is measured at step 1405. Therefore a voltage V3 present on connector 703 is measured which provides an indication of the X position of the applied force.

Pins ten and eleven are then reconfigured as high impedance inputs and pins twelve and thirteen are reconfigured as low impedance outputs at step 1406. The voltage on pin twelve is then set to zero while the voltage on pin thirteen is set to five volts at step 1407. Thus five volts are supplied to connector 703 while connector 704 is grounded. A time delay is provided at step 1408, similar to that at step 1404, before the voltage appearing at pin eighteen is measured at step 1409. Thus a voltage V4 present on connector 705 is measured which provides an indication of the Y position of the applied force. Pins twelve and thirteen are then reconfigured back to their initial state of high impedance inputs.

Therefore by the method described with reference to FIGS. 8 to 14, in mode three and mode four operation, the pressure/location detection circuit 602 is able to make voltage measurements V3 and V4 which provide an indication of the X and Y co-ordinate position of the force applied to a fabric sensor within an area, and measure voltages V1 and V2 which are proportional to currents passing through the sensor and provide information as to a second characteristic of the applied force. The second characteristic may be the pressure with which the force is applied or a combination of the size of the force and the area. Furthermore, the pressure/location detection circuit 602 combines the voltages V1 and V2 to determine a Z value representative of the second characteristic.

Consequently, in both mode three and mode four operation, the pressure/location detection circuit 602 provides output data representative of X and Y position of the applied force and the Z value. However, in an alternative embodiment the pressure/location detection circuit 602 provides output data corresponding to the measured voltages V1, V2, V3 and V4.

FIG. 15

Figure 15:
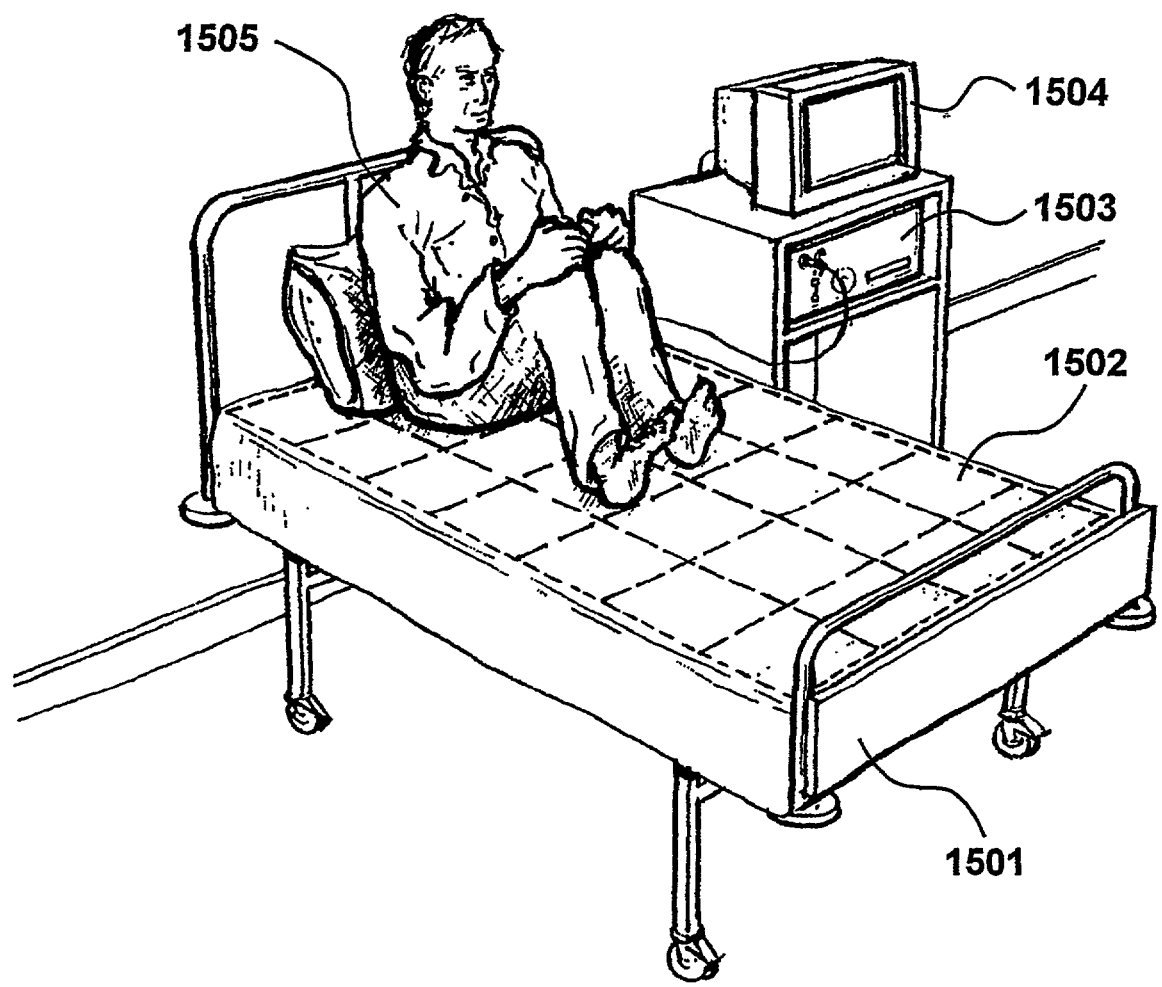
FIG. 15 shows a detection device of the type shown in FIG. 5 being used on a hospital bed.

A detection device of the type shown in FIG. 5 is shown used on a hospital bed 1501 in FIG. 15. The detection device 1502 is positioned on top of the mattress of the bed, forming part of a mattress cover. The device may be covered with conventional hospital bed linen although for the purpose of illustration no bed linen other than the mattress cover and a pillow have been shown in FIG. 15. Consequently, in normal use of the detector 1501, the patient would not reside directly on the detector and would be electrically insulated from the upper electrically conductive fabric layer. The detection device 1502 is connected to the interface device 503 (not shown in FIG. 15) the output 507 of which is connected to a computer 1503. A monitor 1504, connected to the computer, provides a graphic display of the information provided by the detection device. In an alternative embodiment, data from the output 507 is sent via modem to a remote monitoring point.

A bed ridden patient 1505 is shown in a seated position on the detector 1502. A problem of such patients, particularly those of limited or no self-manoeuvrability is the formation of pressure ulcers caused by prolonged periods of pressure applied to one part of the body. The patients must be continuously monitored by nursing staff, and their position altered, in order to prevent the ulcers occurring. Information regarding the magnitude of the pressure applied to the body, the location on the body to which that pressure is applied and the duration of that pressure could assist the nursing staff to monitor the patient and manage the patients movement.

The detection device 1502 differs from that of FIG. 5 in that it has a bottom layer which includes only four conductive bands and not seven. Therefore the detection device has effectively twenty-eight individual regions. For the purpose of illustration only, dotted lines across detection device 1502 indicating the effective division of the detector in to twenty eight regions are included on FIG. 15.

The duration over which data is collected may be long in this application, since the time over which the pressure is applied to the patient by the bed are very long in comparison to the cycling period of the interface device. Periodically, therefore, the interface device, operating in mode two or three, provides the computer with information regarding the pressure applied to the bed by the patient through each of the twenty-eight regions of the device 1502. Preferably, in this application, the device is operated in mode three, and so it will also supply information as to where within each region the pressure is centred.

FIG. 16

Figure 16:
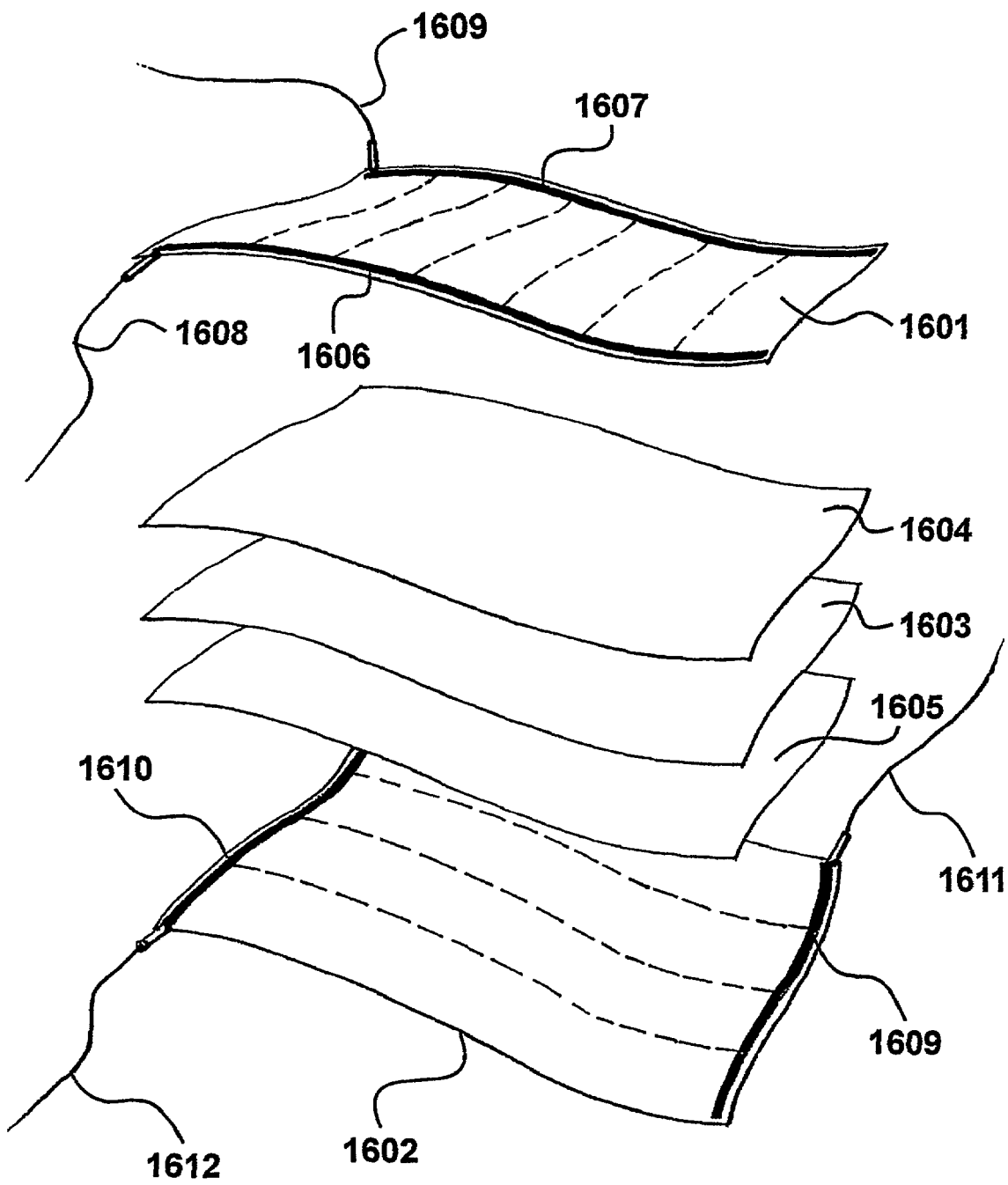
FIG. 16 shows an exploded view of the conductive fabric layers of the hospital bed detector shown in FIG. 15.

An exploded view of the fabric layers of the fabric sensor 1502 are shown in FIG. 16. The structure shown in FIG. 16 is analogous to that shown in FIG. 4. The detector has an upper electrically conductive fabric sheet 1601 and a lower electrically conductive fabric sheet 1602 separated from the upper fabric sheet 1601 by central conductive layer 1603 and intermediate insulating layers 1604 and 1605. The layers 1603, 1604 and 1605 are equivalent in function to layers 403, 404 and 405 shown and described in reference to FIG. 4.

The upper fabric sheet 1601 has a first series of conductive tracks 1606 attached along one edge of the fabric sheet and a second series of conductive tracks 1607 attached along the opposite edge of the upper fabric sheet. Electrical contact is made with the first and second series of conductive tracks via cables 1608 and 1609 respectively which are merged and form a connection with the interface device 503. The first and second series of conductive tracks 1606 and 1607 have seven corresponding conduction portions (not shown) which form electrical contact with the fabric layer so as to define seven conductive columns as illustrated by the dotted lines traversing the upper fabric layer 1601. Each conductive column is capable of having a voltages independently applied thereto during the operation of the detector.

The lower fabric sheet 1602 has a third series of conductive tracks 1609 along one edge of the fabric sheet and a fourth series of conductive tracks 1610 along the opposing edge of the fabric sheet. Electrical contacts are made to the third and fourth series of conductive tracks via cables 1611 and 1612 respectively. The third and fourth conductive tracks 1609 and 1610 define four corresponding conduction portions (not shown) which form electrical contact with the fabric layer so as to define four conductive rows as illustrated by the dotted lines traversing the lower fabric layer 1602. The electrically conductive rows of lower fabric sheet 1602 are arranged perpendicularly to the columns defined by upper fabric sheet 1601 as previously described. Accordingly, the warp conductive fibres of layer 1601 are arranged so as to conduct along the length of the columns indicated by the dotted lines and the conductive fibres of fabric layer 1602 are arranged to conduct along the length of the rows as indicated by the dotted lines.

Figure 17A:
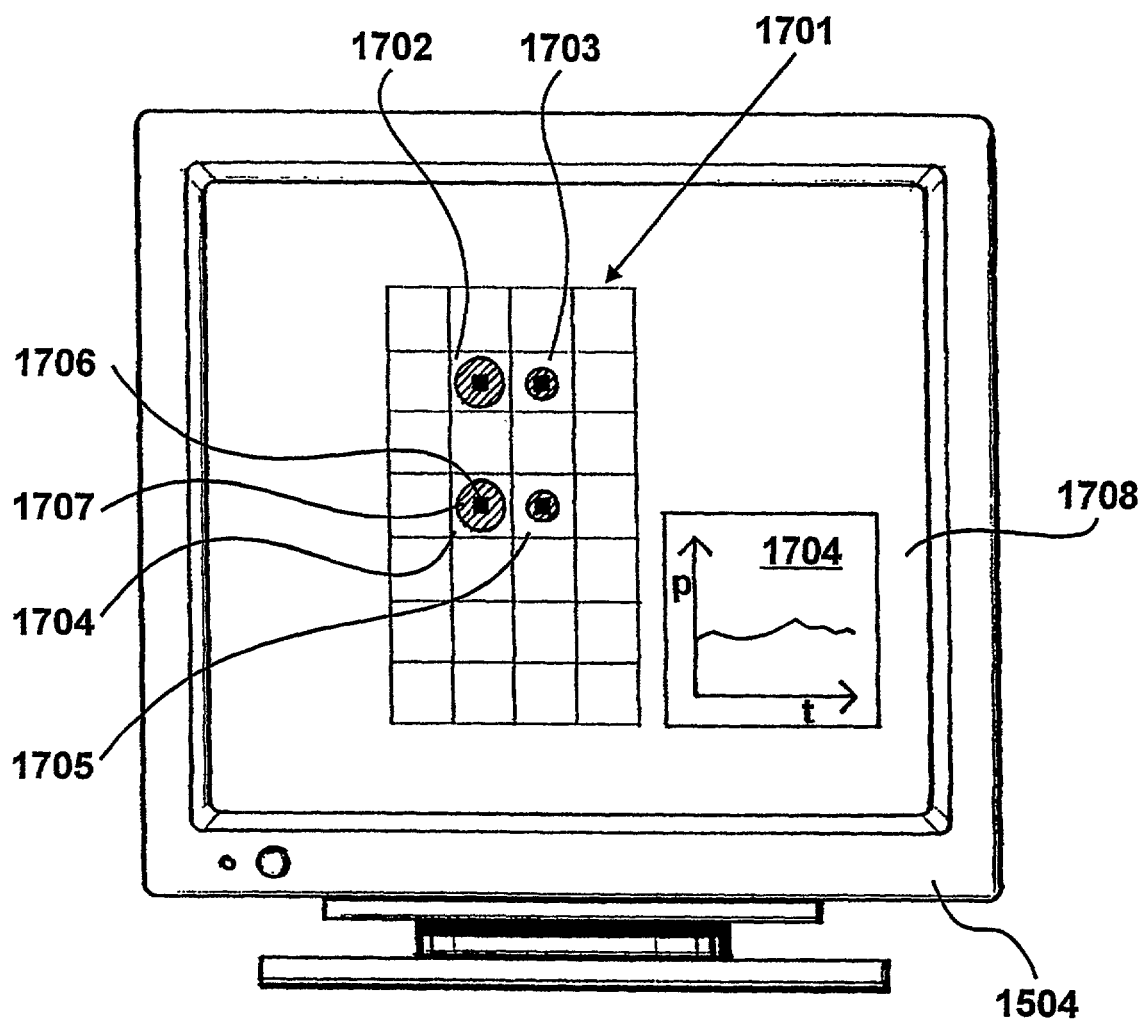
FIGS. 17A and 17B show a computer monitor with a graphic display of data acquired from the device of FIG. 15.

In mode two operation the detector operates to provide an indication of the pressure within each region of the detector. An example of a display of an output in response to a mechanical interaction as shown on monitor 1504 of FIG. 15 is shown in FIG. 17A. The monitor provides a graphical display of the data stored by the computer 1503. The display shows a graphic representation of the detection device 1501 divided into the twenty-eight individual regions. The bedridden patient 1505 shown sat up in bed 1501 of FIG. 15 forms contact with the detector at the position of the buttocks and the heels of the feet.

FIG. 17

The mechanical interactions thus formed between the patient and the detector are shown graphically on grid display 1701. Mechanical interactions are shown as occurring in regions 1702 and 1703 which correspond to the contacts formed by the right and left buttocks respectively and 1704 and 1705 which correspond to the contacts formed by the right and left heels of the patient respectively. A mechanical interaction within a region is indicated on the grid display (in mode two operation) as a dot within the centre of the region, such as that shown at 1706. The pressure measured within that region is represented by a circle, such as that shown by 1707, the diameter of which is directly proportional to the extent of the pressure applied. It can therefore be seen from FIG. 17A that the occupier of the bed 1505, in this example, is exerting more pressure on the right buttock and heel as indicated by the larger diameter circles present in regions 1702 and 1704 as compared with the pressure exerted by the left buttock and heel in regions 1703 and 1705. Such a situation would arise when, for example, the occupier leans to the right hand side. Further information may be displayed such as chart 1708 which shows the variation of pressure over time within a given region, in this case region 1704.

Figure 17B:
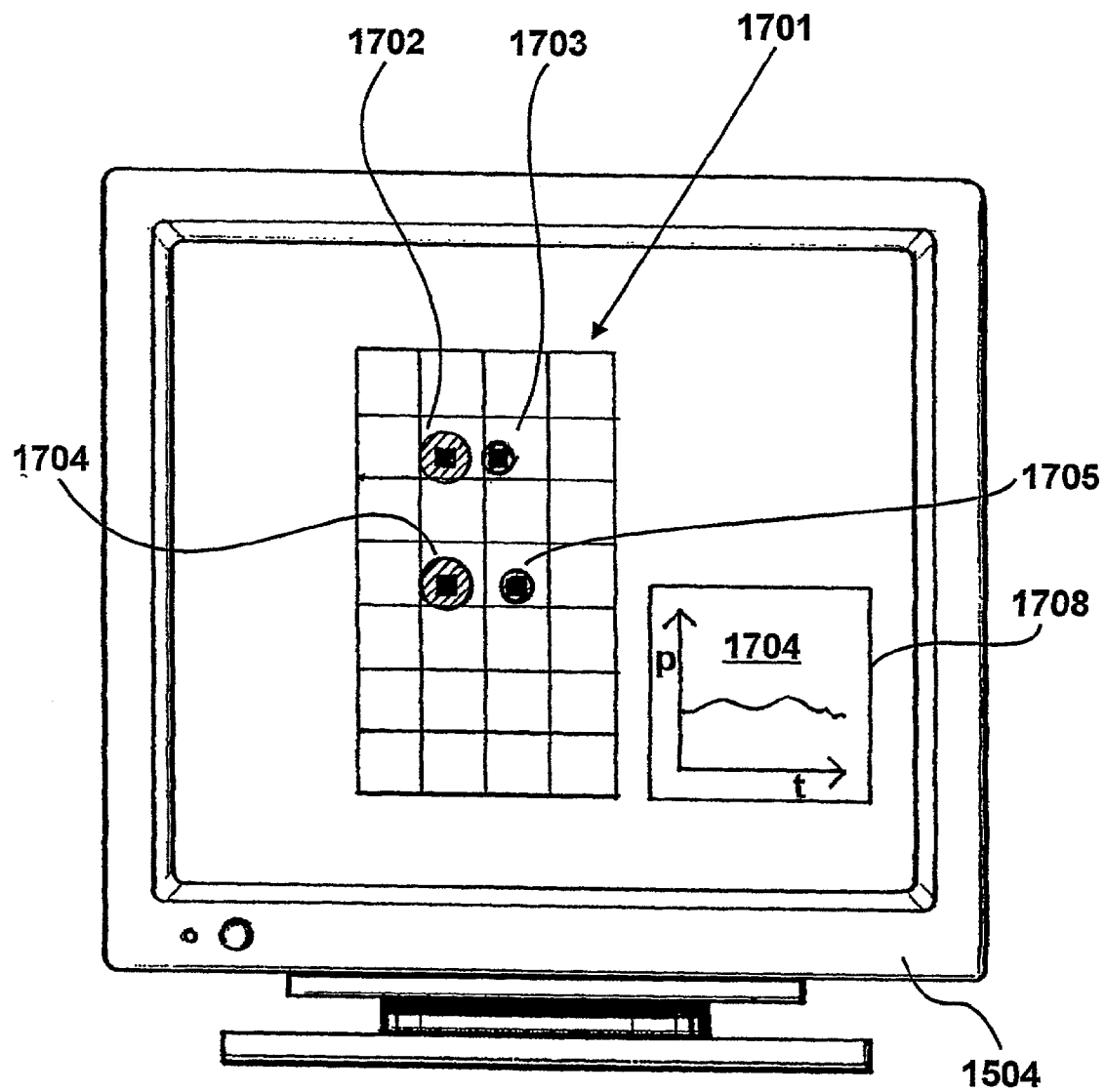

An example of graphic display of an output obtained during mode three operation is shown in FIG. 17B. Monitor 1504 shows a grid display 1701 corresponding to the twenty eight regions of detector 1502. In addition to showing the pressure of a mechanical interaction within a region as discussed in reference to FIG. 17A, during mode three operation, the position of the centre of the mechanical interaction is also determined within a region. The patient 1505 exerts a pressure within the areas 1702 to 1705 as previously described. The position of the centre of force exerted by the patient's right heel within the region 1704 is shown at square 1706 which in this display is not central to this region. Similarly, the position of the right and left buttocks and the left heel within the respective regions 1702, 1703 and 1705 is also shown. As for FIG. 17A, the pressure is represented by the diameter of circle 1707 displayed around the centre position of interaction. In addition further time related pressure information may be displayed as shown in chart 1708 relating to the pressure recorded over time within the selected region 1704.

FIG. 18

Figure 18:
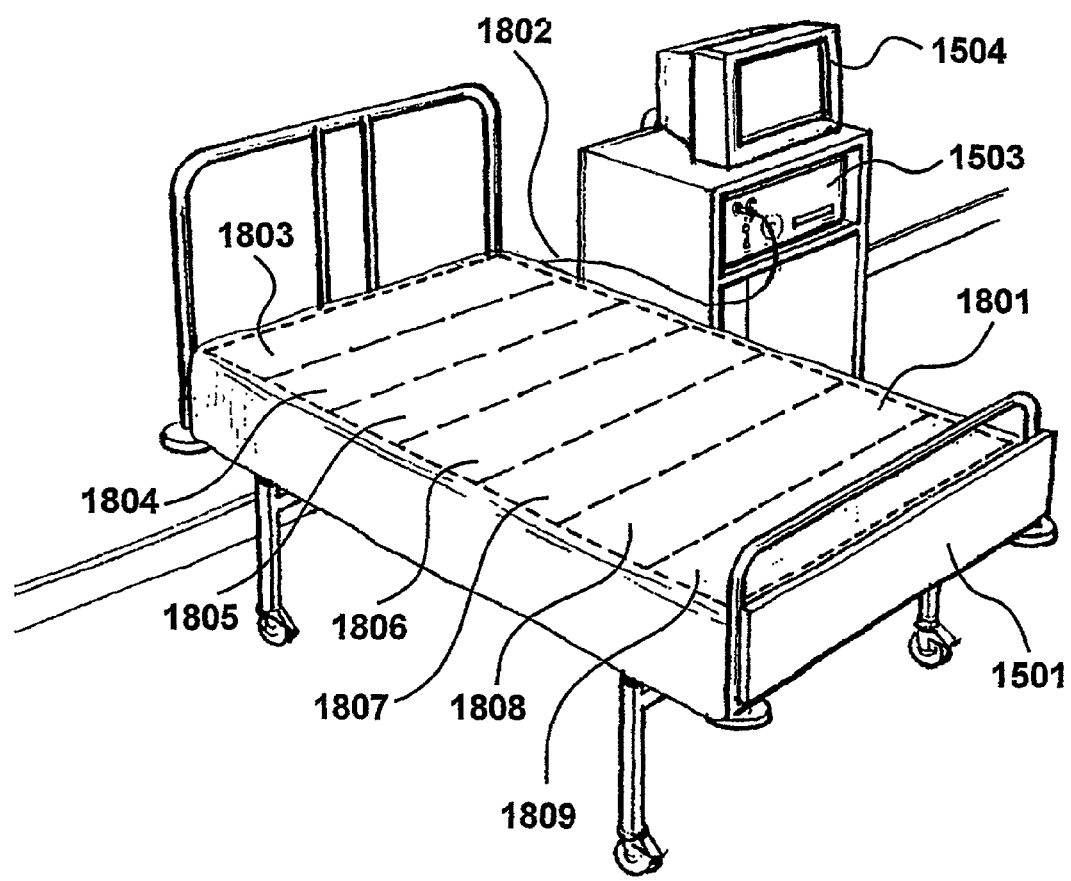
FIG. 18 shows an alternative embodiment of the detector shown in FIG. 5 being used on a hospital bed.

An alternative embodiment of a detector according to the present invention incorporated into a mattress cover is shown in FIG. 18. As before, the hospital bed 1501 has a detector 1801 incorporated into the mattress cover and the detector is connected to the computer 1503 via an interface device (not shown) and cable 1802. A monitor 1504 displays data collected and stored by the computer 1503. The detection device is divided into just seven regions 1803 to 1809 in the form of seven conductive bands as illustrated by the dotted lines shown on the detector 1801. This represents an alternative configuration of the device which, in this application, will correspond to specific regions of a patients body. For example, for a typical adult lying down on the bed 1501, region 1803 would correspond to the pressure exerted via pillow from the head region of the patient and region 1804 would correspond to the neck and upper shoulders of the patient. Similarly, region 1806 may correspond to the lower back and region 1808 or 1809 would correspond to the patients' feet. In this regard, the patients' body is effectively segmented into regions corresponding to the regions defined by the detector within which pressure can be recorded and monitored to alert hospital staff to any regions of the body exposed to prolonged contact pressure that may give rise to a pressure sore. It will be appreciated that the number and dimensions of the individual areas may be varied to effectively segment the patients' body as desired.

FIG. 19

Figure 19:
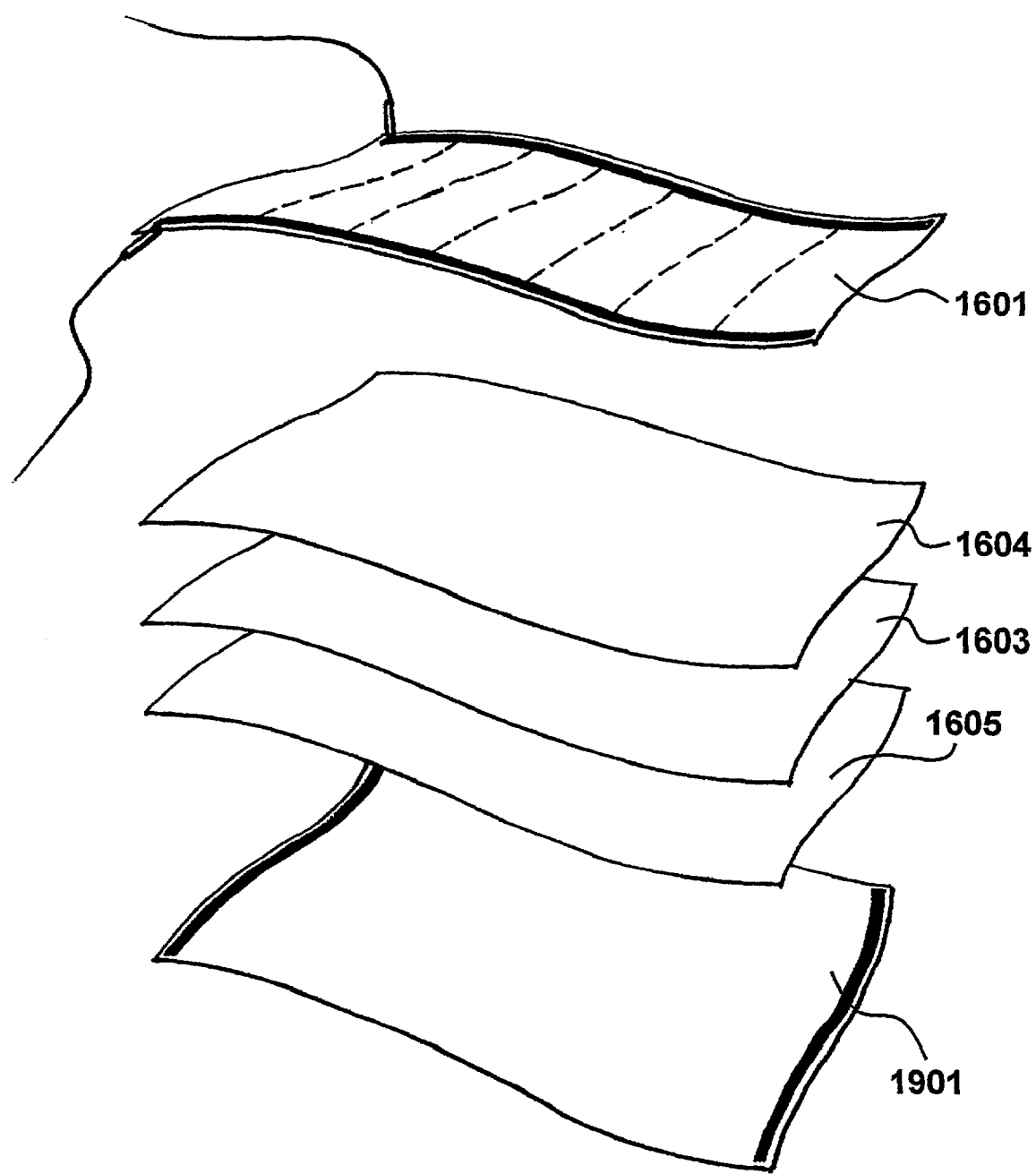
FIG. 19 is an exploded view showing the fabric layers of the embodiment shown in FIG. 18.

FIG. 19 shows an exploded view of the detector 1801 shown in illustrated in FIG. 18. The upper fabric layer 1601, central conductive layer 1603 and intermediate insulating layers 1604 and 1605 are identical to those shown in FIG. 16. The difference between the detectors occurs in the lower electrically conductive fabric sheet 1901. The lower fabric sheet only comprises one conductive band instead of the four conductive bands which the fabric sheet 1602 of FIG. 16 comprised. The lower conductive layer may be conductive in both the warp and the weft directions. In such a case, the lower fabric sheet would, therefore, be conductive in all directions.

Information regarding the pressure with a region is again preferably collected during mode two or three operation and may be displayed in a similar manner to that shown in FIGS. 17A and 17B with the grid display 1701 appropriately amended to illustrate seven horizontal columns only. All other features of the display shown in FIGS. 17A and 17B and described in the corresponding description would be equally applicable to the display of the outputs from detector 1801.

FIG. 20

Figure 20:
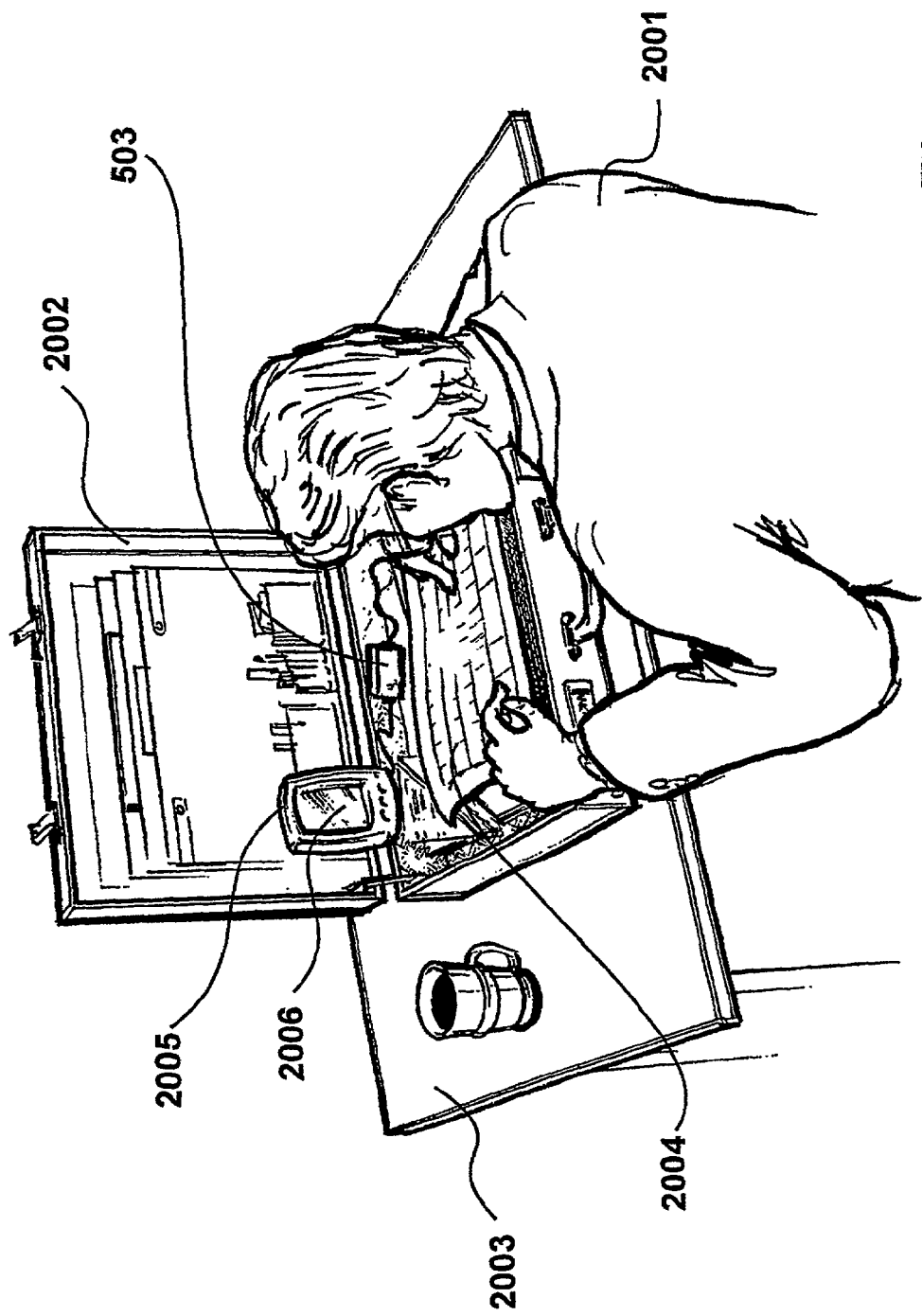
FIG. 20 shows a further embodiment of a detector in the form of a fabric keyboard being used by an operator.

A further detector according to the present invention is shown, in use, in FIG. 20 embodied in the form of a fabric keyboard. In FIG. 20 an operator 2001 is shown working within a confined space of brief case 2002 supported on table top 2003. Such a circumstance is likely to occur in the case of a worker travelling by train or working in an out of office location. The operator 2001 is interacting with the fabric keyboard detector 2004 which is connected via interface device 503 to a hand-held processor 2005. An example of a suitable hand-held processor would be a Palm$^{RTM}$ Vx processor manufactured by Palm Inc. By pressing key representations on the fabric keyboard 2004, the operator 2001 can input data items into the hand-held processor 2005 which are displayed on the screen 2006. It is an important feature of the present invention that the fabric keyboard 2004 is flexible so as to enable convenient operation of the fabric keyboard in a variety of locations and to enable convenient storage of the keyboard.

FIG. 21

Figure 21:
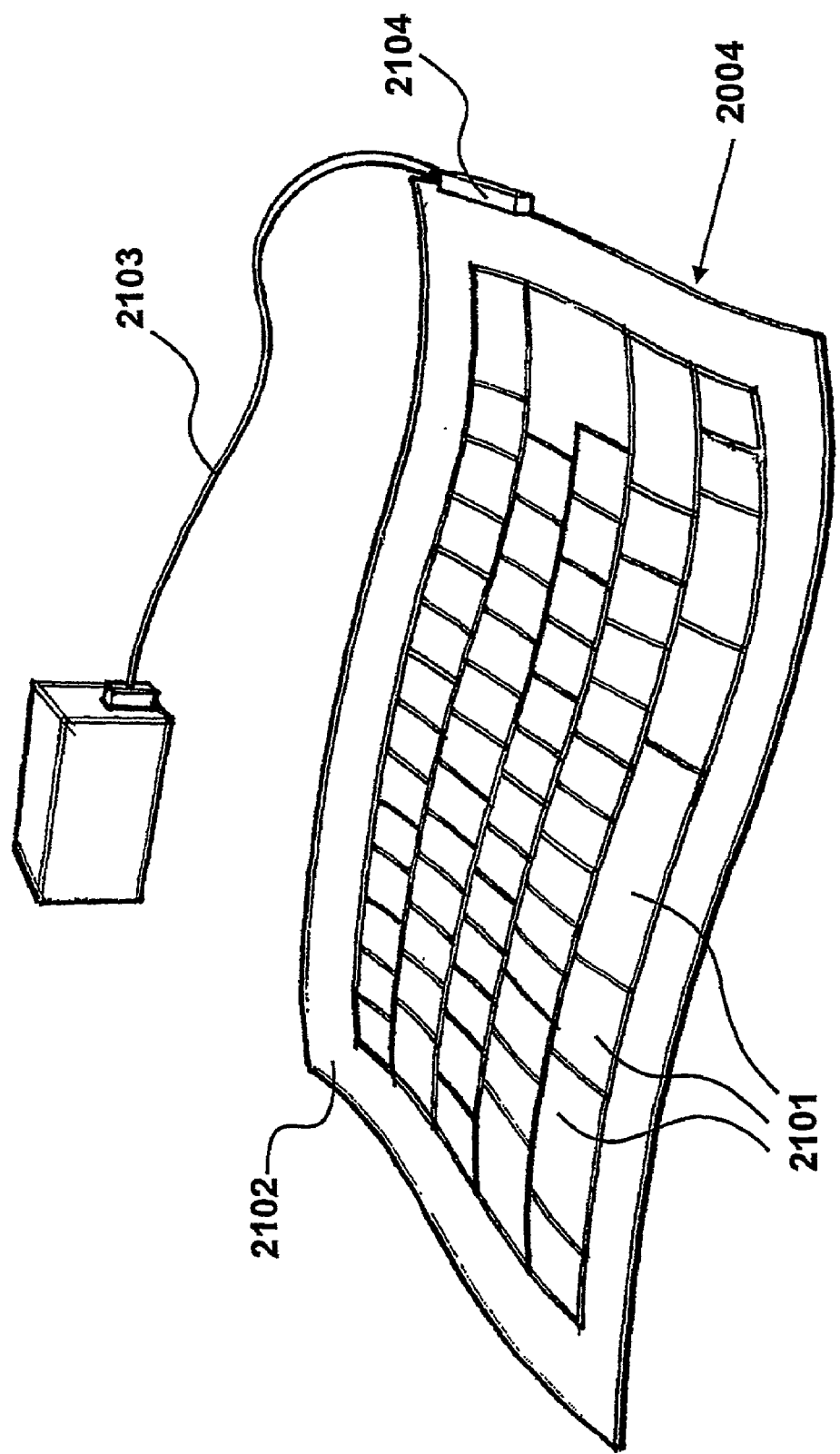
FIG. 21 is a perspective view of the fabric keyboard shown in FIG. 20.

The fabric keyboard detector 2004 is shown in FIG. 21. The fabric keyboard 2004 has key identification icons 2101 printed onto the upper surface 2102 of the detector. The key identification icons enable the operator to make a specific selection corresponding to the desired alpha numeric data input required. The upper fabric surface 2102 is an insulating layer configured to prevent direct contact between the operator and the electrically conductive fabric layers of the detector.

Voltages are applied to the detector and voltage outputs detected by interface device 503 via cable 2103 which connects to the fabric keyboard 2004 by connection port 2104. Output cable (not shown) provides outputs from the interface device to the palm processor 2005 of FIG. 20 (not shown in FIG. 21).

FIG. 22

Figure 22:
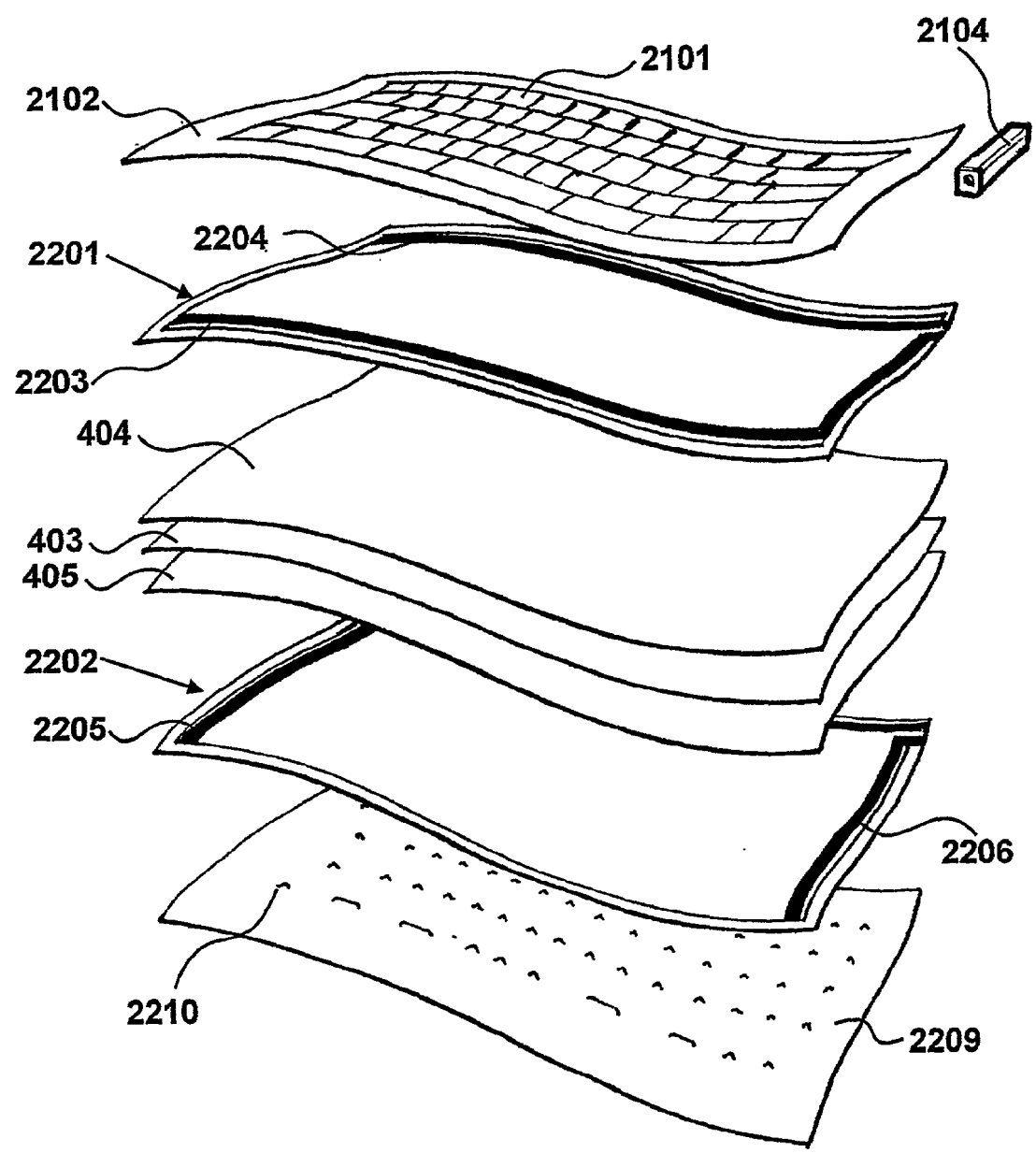
FIG. 22 is an exploded view of the fabric keyboard detector showing the individual fabric layers.

An exploded view illustrating the fabric layers that form the fabric keyboard detector 2004 is shown in FIG. 22. The device has a first electrically conductive fabric layer 2201 and a second electrically conductive fabric layer 2202. The structure of these fabric layers will be described in more detail in reference to FIG. 23 and it will suffice to mention at present that electrically conductive layer 2201 has conductive track assemblies 2203 and 2204 positioned along opposing edges of the fabric layer so as to effectively divide the fabric layer into a series of conducting columns between conductive track assemblies 2203 to 2204. Similarly, electrically conductive layer 2202 has conductive track assemblies 2205 and 2206 along opposing edges of the fabric layer and arranged perpendicular to the conductive track assemblies of layer 2201 so that fabric layer 2202 is effectively divided into a series of conducting rows across the fabric layer from conductive track 2205 to 2206, the conducting rows being perpendicular to the conductive columns of the upper layer 2201. The respective conductive tracks of layers 2201 and 2202 are fed into connection port 2104.

The seven layer detector device also includes a central conductive layer 403 and intermediate insulating layers 404 and 405 which have previously been described in reference to FIG. 4.

A top insulating layer 2102 is also included in the device. This is a woven layer of insulating fabric onto which a "QWERTY" keyboard outline 2101 has been printed on the upper surface. A bottom insulating layer 2209, of woven fabric, completes the device. Layer 2209 supports an array of key registration devices 2210 in the form of raised portions, which are arranged so that each device 2210 is aligned with the centre of a QWERTY key outline 2101 on layer 2102. The purpose of the key registration devices 2210 is to enable the operator to positively identify that a key has been pressed by providing tactile feedback.

FIG. 23

Figure 23:
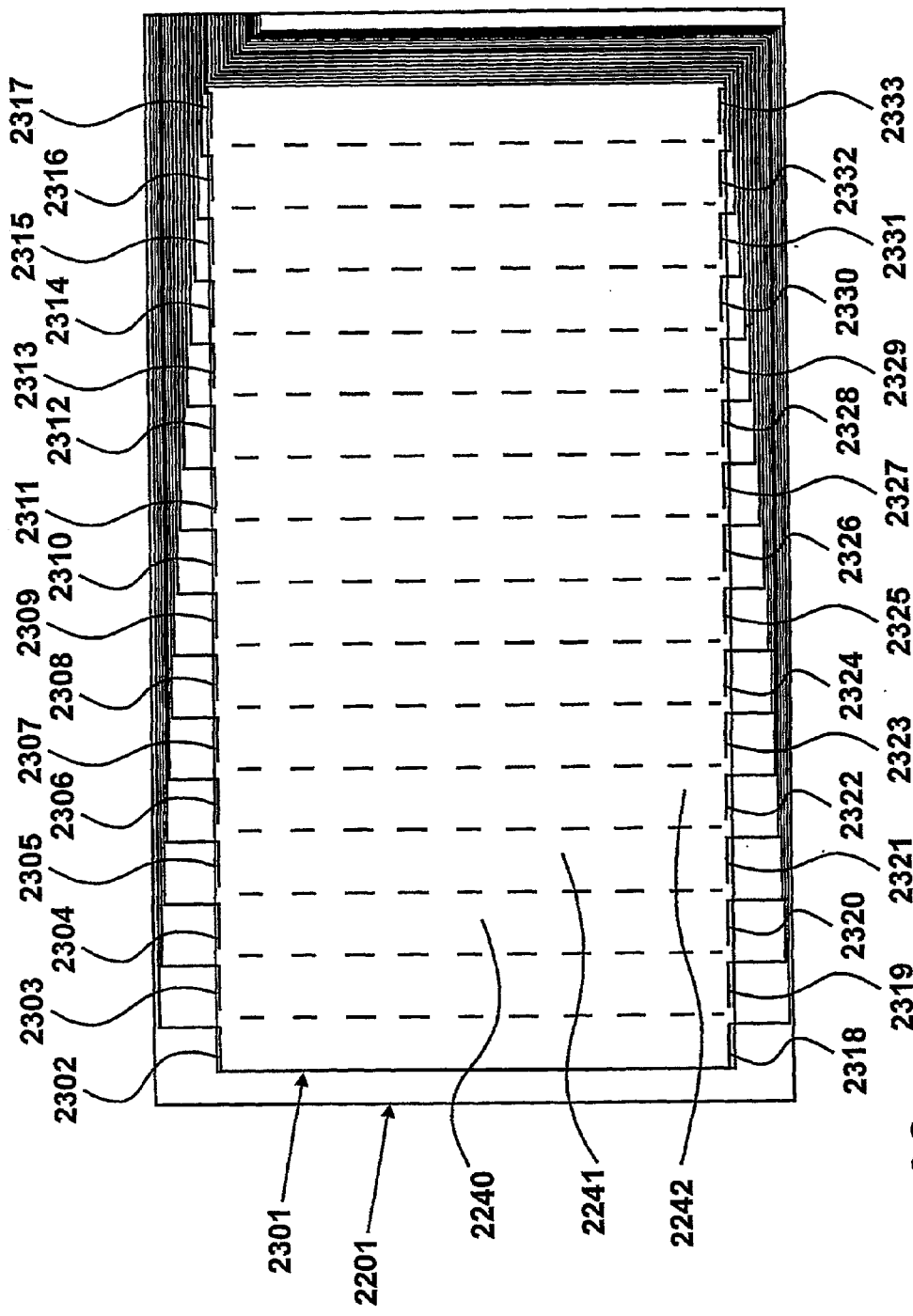
FIG. 23 is a plan view of the electrically conductive fabric layer 2201 shown in FIG. 22.
Figure 24:
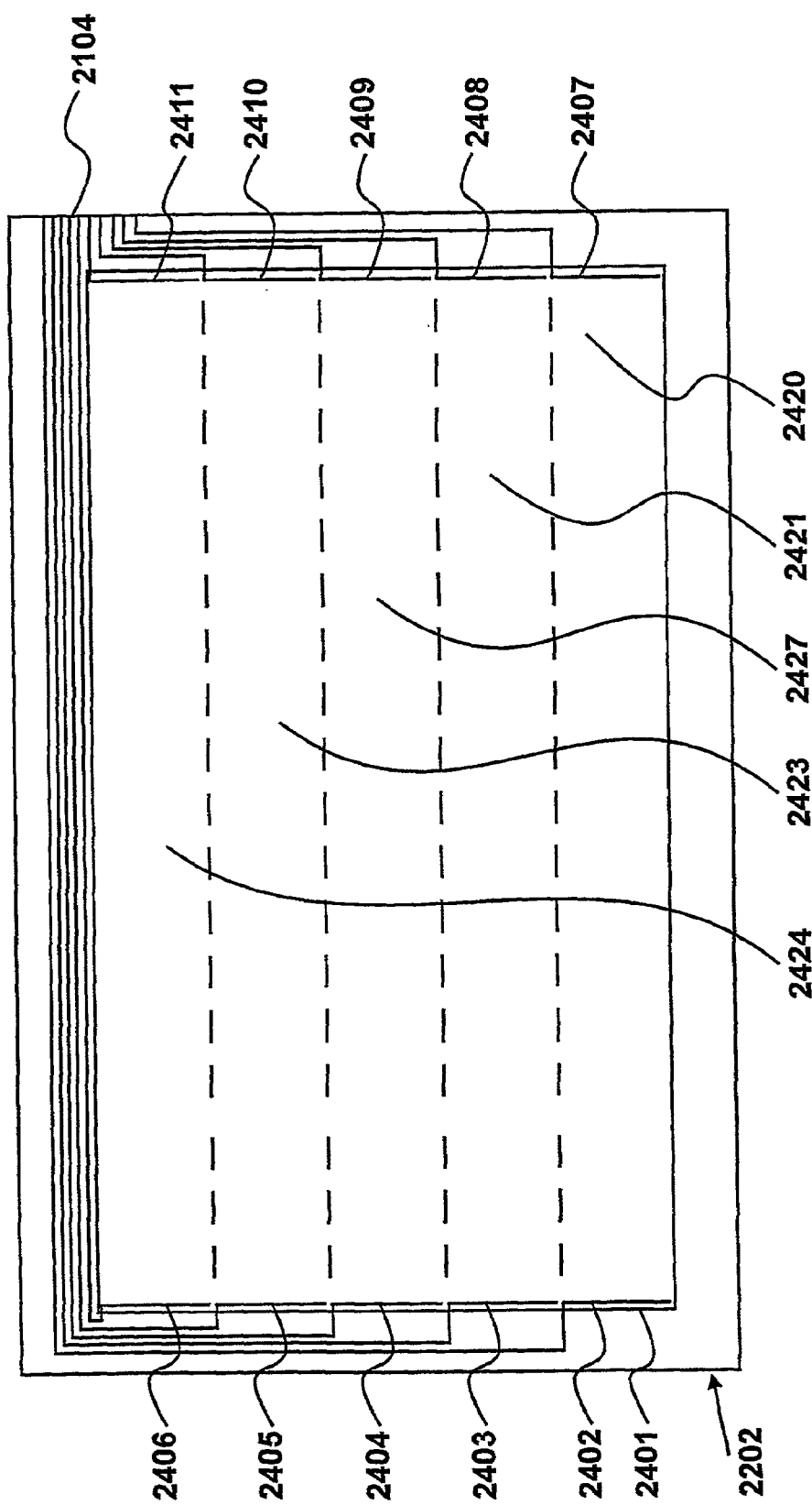
FIG. 24 is a plan view of the electrically conductive fabric layer 2202 shown in FIG. 22.

The first electrically conductive layer 2201 is shown schematically in FIG. 23. The fabric layer comprises a key detection area 2301 which corresponds to the area of the keyboard detector within which the key presses are to be detected. The remaining portions of the fabric layer comprise the conductive tracks that form electrical connections between the detection area 2301 and the interface device 503. The conductive track assembly 2204 shown in FIG. 22 is shown in FIG. 24 as individual conductive tracks having respective attachment portions 2302 to 2317 along an edge of the detection area 2301. The conduction portions of each conductive track are grouped together and received within the connection port 2104 shown in FIGS. 21 and 22. In addition, the conductive track assembly 2203 shown in FIG. 22 is also shown in FIG. 24 as individual conductive tracks having respective attachment portions 2318 to 2333 along the opposing edge of the detection area 2301. The conduction portions of each conductive track are also grouped together and received within the connection port 2104 shown in FIGS. 21 and 22. The conduction portions are electrically connected via a cable to the interface device 503 shown in FIG. 21.

The conductive warp fibres extend perpendicularly across the detection region 2301 from the attachment portions 2302 to 2317 and 2318 to 2333, thus defining sixteen narrow conductive columns. The columns, for example 2340, 2341 and 2342, are shown by the dotted lines across the detection area 2301.

FIG. 24

The second electrically conductive layer 2202 is detailed in FIG. 24. The second conductive layer has a corresponding detection area 2401 which, in this embodiment, is exactly the same dimensions as the detection area 2301 of fabric layer 2201. The conductive track assembly 2205 shown in FIG. 22 is shown as individual conductive tracks having attachment portions 2402 to 2406 attached along an edge of the detection area 2401. The respective conductive portions are grouped together and extend into the connection port 2104 where electrical connection to the interface device is made. Similarly, conductive track assembly 2206 as shown in FIG. 22 is shown as the individual conductive tracks having attachment portions 2407 to 2411 formed along the opposing edge of the detection area 2401. Accordingly, the detection area is divided into five independent electrically conductive rows, for example rows 2420 to 2424, as indicated by the dotted lines. As previously described in reference to the bed mattress embodiment shown in FIGS. 15 to 17, the conductive fibres of the second conductive layer 2202 are arranged at ninety degrees to the conductive fibres of the first conductive layer 2201 such that, in effect, the second layer is conductive in a direction perpendicular to that of the first fabric layer. Hence, the conductive rows of the second layer 2202 (for example 2420 to 2424) are arranged perpendicularly to the conductive columns (for example 2240, 2241 and 2242) of the first electrically conductive layer 2201. In the assembled detector, therefore, the intersections between the respective rows and columns effectively divides the detection area into eighty (equal to 16×5) individual regions. Furthermore, a mechanical interaction, such as a finger press or other compression, may result in a current flow within a particular regions between conductive layers 2201 and 2202.

FIG. 25

Figure 25:
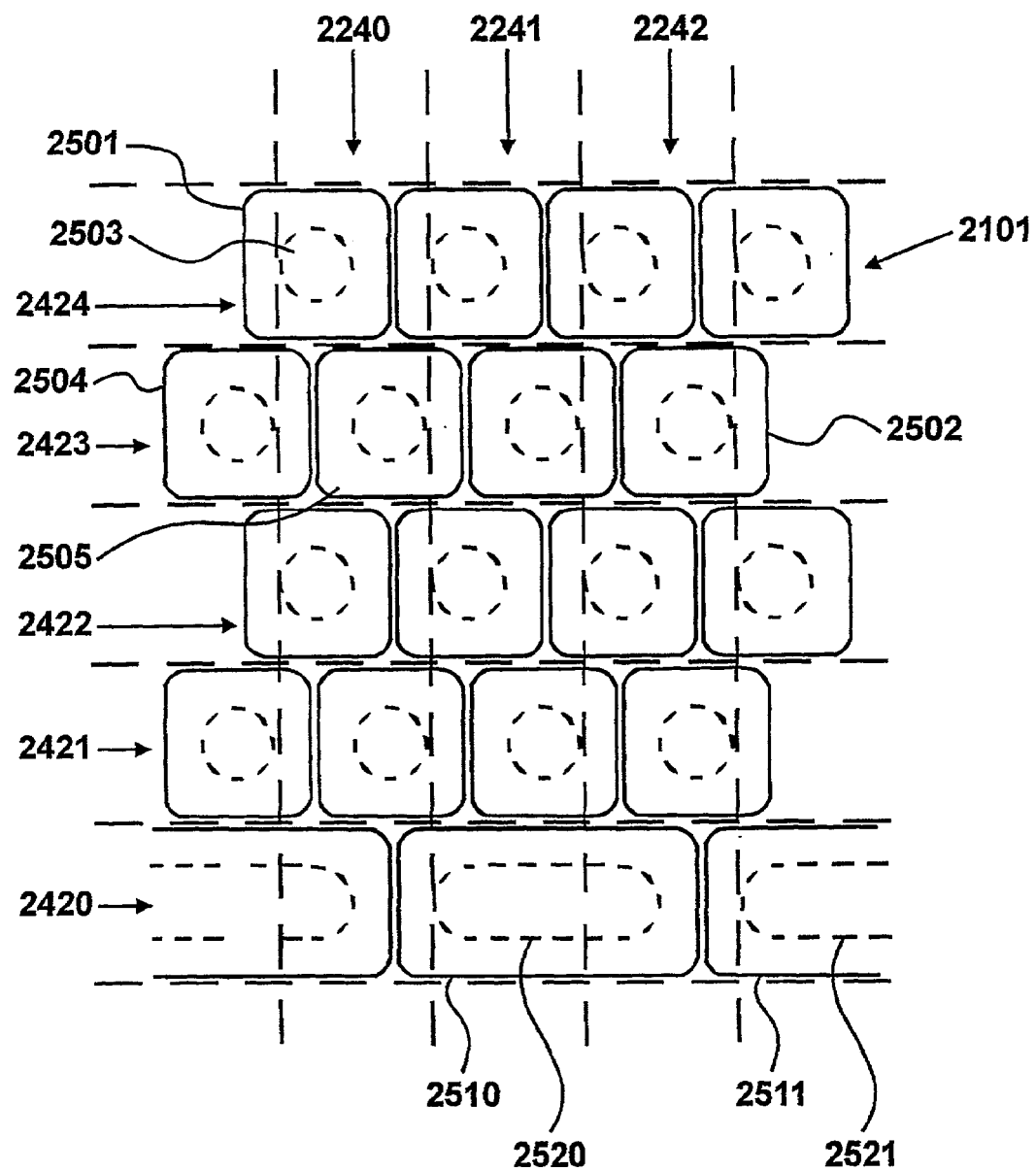
FIG. 25 is a plan illustration of the location of the keys of the fabric keyboard in relation to the regions into which the keyboard detector is divided.

FIG. 25 shows a plan view of a portion of the detector showing the printed key identification icons 2101 of the upper layer 2102 of the fabric layer. Superimposed over the key identification icons are dotted lines indicating the columns and rows formed across the detection portions 2301 and 2401 of the first and second electrically conductive layers and the key registration devices 2210 positioned on the lower layer of the detector (as detailed in FIG. 22). The five conductive rows 2420 to 2424 of layer 2202 and three of the conductive columns 2240 to 2242 of layer 2201 are shown in FIG. 25. Each intersection of a row and a column defines a separate region of the input device and each region corresponds to one of the QWERTY keys printed onto the top layer 2102. For example, a key outline 2501, corresponding to the key graphically labelled "2", corresponds to the intersection of row 2424 and column 2240, and key outline 2502, corresponding to the key labelled "R", corresponds to the intersection of row 2423 and column 2242.

Each key outline is arranged to be symmetrically positioned above a key registration device 2210 on layer 2209. For example, key outline 2501 is positioned symmetrically above key registration device 2503.

As shown in FIG. 25, the key outlines are arranged in a staggered manner, such that for the alpha-numeric keys, the centre of a key on one row is aligned with the gap between the keys on the row below. For example, key outline 2501, is located such that its centre is aligned with the gap between key outlines 2504 and 2505. Therefore, the key outlines do not correspond exactly with the conductive band intersections. However, the key registration device for a particular key is located within the area defined by the key outline and the area defined by the corresponding conductive band intersection. Therefore, when a user presses a key, for example 2501, because the key registration device (in this case 2503) is located within the corresponding intersection of bands, (in this case bands 2240 and 2424) the conducting layers 2201 and 2202 are electrically connected at the correct intersection.

FIG. 25 also shows key outline 2510 and part of outline 2511 corresponding to the "Alt" key and "Spacebar" respectively. Since they are keys of extended length, the respective key registration devices 2520 and 2521 are extended in a corresponding manner. Unlike key registration device 2503, the key registration devices 2520 and 2521 are solid strips of 15 plastic glued to layer 2209. Therefore, devices 2520 and 2521 only provide tactile feedback in respect of position of the key and do not deform under pressure in the manner of device 2503.

The fabric keyboard detector embodiment of the present invention can be operated, preferably in mode one whereby the region within which a mechanical interaction is detected is determined by the multiplexing operation. It is preferable as there is only a requirement to detect whether a key press has occurred within a specific region and, in this embodiment, no further information regarding the nature of the mechanical interaction is required. It must be noted that in mode one operation where only the presence or absence of any current flowing from electrically conductive layer 2201 to layer 2202 or vice versa is detected there is no specific requirement for an attachment portion of a second conductive track assembly (for example 2203 and 2206, FIG. 22) on the opposing edge to a set of first attachment portion of a given column (for example 2204 and 2205, FIG. 22). Mode three operation could facilitate the incorporation of more than one key registration within a given region with the interface device with the capacity to distinguish which key has been pressed, but such an arrangement would have the disadvantage of not being able to distinguish two such keys when pressed simultaneously.

Due to the large number of individual regions incorporated into the fabric keyboard embodiment, it will be appreciated that to individually time multiplex all eighty regions of the detector may take a prolonged period. This may be a disadvantage when, for example, a trained speed typist is using the keyboard. Accordingly, a mechanism by which the detector can more rapidly identify the region within which a mechanical interaction has occurred utilising a reduced number of scanning procedures would be a distinct advantage.

An example of such a mode of operation is illustrated in FIG. 25 and the following description. The interface device 503 must identify a press on the fabric keyboard 2004. When the detection area of the QWERTY keyboard is pressed, then the interface pressure/location detection circuit 602 provides an output identifying the location of the one or two keys which have been pressed.

In the initial state, however, the multiplex switching circuit 604, under the control of detection processor 601, connects a single connection of the pressure/location detection circuit 602 to all sixteen attachment portions 2302 to 2317 on one side of the layer 2201, and a second single connection to all five attachment portions 2402 to 2406 on one side of layer 2202. If, on viewing these terminals, an open circuit is present, no mechanical interaction has occurred on the input device. Alternatively, if a closed circuit is identified, this indicates the presence of a mechanical interaction and an output to this effect is supplied to the switching circuit 603 which in turn conveys this information to the detection processor 601 and to output socket 507.

On detection of a mechanical interaction, the multiplex switching circuit 604 under the control of detection processor 601, maintains the single connection of the pressure/location detection circuit 602 to all five attachment portions 2402 to 2406 on one side of the layer 2202, and a second single connection is made from the circuit 602 to the leftmost eight of the attachment portions (2302 to 2309) on one side of layer 2201. Again the pressure/location detection circuit 602 detects the presence of a closed or open circuit; a closed circuit indicating one or more key presses in the leftmost half of the input device. An output indicative of an open or closed circuit is supplied to the switching circuit 603 which in turn conveys this information to the detection processor 601 and to output socket 507.

The multiplex switching circuit 604 is then commanded by the detection processor to disconnect the connection to the eight leftmost attachment portions of layer 2202 and make connection from the pressure/location detection circuit 602 to the remaining seven short attachment portions 2310 to 2317. Again an open or closed circuit is detected and the information relayed to the detection circuit 601. A closed circuit at this stage indicates one or more key presses in the rightmost half of the OWERTY keyboard outline.

Alternatively, if one or more key presses are detected relating to either the eight leftmost attachment portions 2302 to 2309 or the remaining short attachment portions 2310 to 2317, then the detection processor 601 performs a binary search to identify the conducting row and column intersection at which a mechanical interaction is present. The circuit does this by a process of elimination. For example, if a key press is not detected in the columns relating to attachment portions 2310 to 2317 then no further search is necessary in respect of these columns. But, if a key press is detected in the eight leftmost conducting columns relating to attachment portions 2302 to 2309, the multiplex switching circuit 604 under the control of detection processor 601 makes a connection from pressure/location detection circuit 602 to the first four attachment portion 2302 to 2305 of layer 2201 and a second connection to the five attachment portions (2402 to 2406) on one side of layer 2202. Pressure/location detection circuit then detects the presence of an open or closed circuit and provides an indicative output to detection processor 601. The multiplex switching circuit 604, then makes a connection from pressure/location detection circuit 602 to the next four attachment portions 2306 to 2309 of layer 2201 while maintaining the second connection to the five attachment portions (2402 to 2406). The pressure/location detection circuit detects the presence of an open or closed circuit and provides an indicative output to detection processor 601.

Thus, the control circuit identifies if just one or both of the two groups of four columns is subject to a key press. If just one of the two groups is identified as relating to a key press, then this group only is interrogated and the other group is eliminated from further search. But if both groups are identified as relating to a key press, then both groups will need to be interrogated further.

The process of binary search is continued in this manner until the identity of the individual columns relating to the key press or presses is established. A similar process is then followed to establish which of the rows contains the key press or presses. This is done by making connection of the location detection device to all sixteen attachment portions on one side of layer 2201 and a second connection to a varying number of the attachment portions (2402 to 2406) on layer 2202. Having established both the row and the column, the detection processor 601 then provides an output indicating the location(s) to output socket 507 via the second switching circuit 603. The detection processor then resets the multiplex switching circuit to its initial state in readiness for the next mechanical interaction to be detected.

By utilising this operation process, the number of connections required to be made to detect the region of the detector in which the interaction occurs is reduced compared to the time multiplexed detection of each individual region. It will be appreciated, however, that there are numerous alternative mechanisms by which the different regions of the detector are selected in order to determine the precise region within which the interaction is occurring.

The invention claimed is:

1. A detector constructed from electrically conducting fabric and configured to present a varying electrical characteristic in response to a mechanical interaction, wherein
   a first conducting layer is displaced from a second conducting layer such that conduction between said conducting layers results when said conducting layers are mechanically forced together, wherein
   the first of said conducting layers has a plurality of lengths of conductive yarn and a plurality of lengths of non-conductive yarn machined therein, such that at least one length of conductive yarn is electrically isolated from another of said lengths of conductive yarn,
   a plurality of electrical conductors are connected to said conductive yarns in the first of said conducting layers thereby electrically grouping said conductive yarns to define a plurality of identifiable rows, thereby defining specific regions of the detector;
   each said identifiable row has one of said electrical conductors at each of its opposing ends, thereby allowing different electrical potentials to be applied to each end of conductive yarn within a row; and
   at least one identifiable row includes a plurality of lengths of conductive yarn in which one length of conductive yarn of the identifiable row is electrically isolated from another of said lengths of conductive yarn.

2. A detector according to claim 1, wherein said conductive yarn of said first layer extends in a first direction and said non-conductive yarn of said first layer extends in a second direction, said first direction being different to said second direction.

3. A detector according to claim 1, wherein the second of said conducting layers has a plurality of lengths of conductive yarn and a plurality of lengths of non-conductive yarn machined therein, such that at least one length of conductive yarn is electrically isolated from another of said lengths of conductive yarn;
   the first of said conducting layers has conductive yarn extending in a first conducting direction and the second of said conducting layers has conductive yarn extending in a second conducting direction;
   the first conducting direction of the first conducting layer is different from the second conducting direction of the second conducting layer;
   a plurality of electrical conductors are connected to said conductive yarns in the second of said conducting layers thereby electrically grouping said conductive yarns to define a plurality of identifiable columns;
   each said identifiable column has one of said electrical conductors; and intersections of said columns and said rows define specific regions of the detector.

4. A detector according to claim 3, wherein each said identifiable column has an electrical conductor at each of its opposing ends.

5. A detector according to claim 1, wherein said second conducting layer has conductive yarn extending in a first direction and conductive yarn extending in a second direction, said first direction being different to said second direction.

6. A detector according to claim 1, wherein said second conducting layer has non-conductive yarn extending in a first direction and conductive yarn extending in a second direction, said first direction being different to said second direction.

7. A detector according to claim 1, wherein a mechanical interaction has a first property and said detector is configured to present a first set of varying electrical characteristics in response to said first property of the mechanical interaction such that each varying electrical characteristic of said set of varying electrical characteristics corresponds to one of said specific regions.

8. A detector according to claim 1, wherein a degree of pressure is applied by a mechanical interaction and a varying electrical characteristic varies with the degree of pressure applied by the mechanical interaction.

9. A detector according to claim 1, wherein a force is applied at a position by a mechanical interaction and a varying electrical characteristic varies with the position of the force applied by the mechanical interaction.

10. A detector according to claim 9, wherein the mechanical interaction has a second property, said second property being different to the force applied by the mechanical interaction, and said detector is configured to present a second set of varying electrical characteristics in response to said second property of the mechanical interaction.

11. A detector according to claim 10, wherein said second property is the degree of pressure applied by the mechanical interaction.

12. A detector according to claim 1, wherein a partially electrically conducting layer of fabric is disposed between said first and second conducting layers.

13. A detector according to claim 1, wherein said first conducting layer and said second conducting layer are separated by two layers of electrically insulating fabric and said two layers of electrically insulating fabric are separated by a partially electrically conducting layer of fabric.

14. A detector according to claim 1, wherein a force is applied at a position by a mechanical interaction and a potential gradient is applied across at least one of said specific regions to determine the position of the force applied by the mechanical interaction.

15. A detector according to claim 1, wherein said first conducting layer and said second conducting layer constitute single fabric which is constructed to comprise an upper portion and a lower portion, said upper portion comprising non-conductive yarn having insulating fibres extending in a weft direction and conductive yarn having conducting fibres extending in a warp direction, and said lower portion comprising conductive yarns having conducting fibres extending in said weft direction and non-conductive yarns having insulating fibres extending in said warp direction.

16. A detector according to claim 15, wherein said upper and lower portions are periodically attached by the inclusion of one of the non-conductive yarns from one of the upper and lower portions in the other of the upper and lower portions.

17. A detector according to claim 1, wherein said first conducting layer;

said second conducting layer has non-conductive yarn having insulating fibres and conductive yarn having conducting fibres and, said conducting layers are fabricated such that portions of the insulating fibres stand proud of the conducting fibres.

18. A detector according to claim 17, wherein said insulating fibres have a larger dimension than said conducting fibres.

19. A detector according to claim 1, wherein said fabric is constructed using a weaving process.

20. A detector according to claim 1, wherein said fabric is constructed using a knitting process.

21. A detector according to claim 1, wherein said detector is configured for use as a bed mattress cover.

22. A detector according to claim 1, wherein said detector is configured for use as a keyboard.

23. A detector constructed from electrically conducting fabric and configured to present a varying electrical characteristic in response to a mechanical interaction, wherein a first conducting layer is displaced from a second conducting layer such that conduction between said layers results when said layers are mechanically forced together, the first of said layers has a plurality of lengths of conductive yarn and a plurality of lengths of non-conductive yarn machined therein, such that at least one length of conductive yarn is electrically isolated from another of said lengths of conductive yarn, a plurality of electrical conductors are connected to said conductive yarns in the first of said conducting layers thereby electrically grouping said conductive yarns to define a plurality of identifiable rows, thereby defining specific regions of the detector;

each said identifiable row has one of said electrical conductors;

at least one identifiable row includes a plurality of lengths of conductive yarn in which one length of conductive yarn of the identifiable row is electrically isolated from another of said lengths of conductive yar;

a force is applied at a position by a mechanical interaction; and a potential gradient is applied across at least one of said specific regions to determine the position of the force applied by the mechanical interaction.

24. A detector according to claim 23, wherein the second of said layers has a plurality of lengths of conductive yarn and a plurality of lengths of non-conductive yarn machined therein, such that at least one length of conductive yarn is electrically isolated from another of said lengths of conductive yarn;

the first of said conducting layers has conductive yarn extending in a first conducting direction and the second of said conducting layers has conductive yarn extending in a second first conducting direction;

the first conducting direction of the first conducting layer is different to the second first conducting direction of the second conducting layer;

a plurality of electrical conductors are connected to said conductive yarns in the second of said layers thereby electrically grouping said conductive yarns to define a plurality of identifiable columns;

each said identifiable column has one of said electrical conductors; and intersections of said columns and said rows define specific regions of the detector.

25. A detector according to claim 23, wherein said second conducting layer has conductive yarn extending in a first direction and conductive yarn extending in a second direction, said first direction being different to said second direction.

26. A detector according to claim 23, wherein a mechanical interaction has a first property and said detector is configured to present a first set of varying electrical characteristics in response to said first property of the mechanical interaction such that each varying electrical characteristic of said set of varying electrical characteristics corresponds to one of said specific regions.

27. A detector according to claim 23, wherein a partially electrically conducting layer of fabric is disposed between said first and second conducting layers.

28. A detector according to claim 23, wherein said first conducting layer and said second conducting layer are separated by two layers of electrically insulating fabric and said two layers of electrically insulating fabric are separated by an electrically conducting layer of fabric.

29. A detector according to claim 23, wherein each said identifiable column has an electrical conductor at each of its opposing ends.

30. A detector according to claim 29, wherein said first conducting layer and said second conducting layer constitute single fabric which is constructed to comprise an upper portion and a lower portion, said upper portion comprising non-conductive yarn having insulating fibres extending in a weft direction and conductive yarn having conducting fibres extending in a warp direction, and said lower portion comprising conductive yarns having conducting fibres extending in said weft direction and non-conductive yarns having insulating fibres extending in said warp direction.

31. A detector according to claim 23, wherein said fabric is constructed using a weaving process.

32. A detector according to claim 23, wherein said fabric is constructed using a knitting process.

33. A detector constructed from electrically conducting fabric and configured to present a varying electrical characteristic in response to a mechanical interaction, wherein
- a first conducting layer and a second conducting layer are displaced at either side of a third conducting layer such that said third conducting layer provides a conductive path between said first conducting layer and said second conducting layer when said layers are mechanically forced together;
- the first of said layers has a plurality of lengths of conductive yarn and a plurality of lengths of non-conductive yarn machined therein, such that at least one length of conductive yarn is electrically isolated from another of said lengths of conductive yarn;
- a plurality of electrical conductors are connected to said conductive yarns in the first of said layers thereby electrically grouping said conductive yarns to define a plurality of identifiable rows;
- each said identifiable row has one of said electrical conductors;
- at least one identifiable row includes a plurality of lengths of conductive yarn in which one length of conductive yarn of the identifiable row is electrically isolated from another of said lengths of conductive yarn;
- a degree of pressure is applied by a mechanical interaction; and
- said third conducting layer has a conductivity that increases as the degree of pressure applied by the mechanical interaction increases, thereby facilitating conduction between the first conducting layer and the second conducting layer during the mechanical interaction.

34. A detector constructed from electrically conducting fabric and configured to present a varying electrical characteristic in response to a mechanical interaction, wherein said detector comprises:
- a first conducting layer having a plurality of lengths of conductive yarn and a plurality of lengths of non-conductive yarn machined therein, such that at least one length of conductive yarn is electrically isolated from another of said lengths of conductive yarn,
- a second conducting layer is displaced from said first conducting layer,
- a pair of electrically insulating fabric layers separating said first conducting layer and said second conducting layer,
- a third conducting layer of fabric separating said pair of electrically insulating fabric layers, wherein
- said electrically insulating fabric layers and said third conducting layer are configured to allow conduction between said first and second conducting layers when said layers are mechanically forced together, and
- a plurality of electrical conductors are connected to said conductive yarns in the first of said layers thereby electrically grouping said conductive yarns to define a plurality of identifiable rows defining specific regions of the detector; and
- at least one identifiable row includes a plurality of lengths of conductive yarn in which one length of conductive yarn of the identifiable row is electrically isolated from another of said lengths of conductive yarn.

35. A detector constructed from electrically conducting fabric and configured to present a varying electrical characteristic in response to a mechanical interaction, wherein
- a first conducting layer is displaced from a second conducting layer such that conduction between said conducting layers results when said conducting layers are mechanically forced together, wherein
- the first of said conducting layers has a plurality of lengths of conductive yarn and a plurality of lengths of non-conductive yarn machined therein, such that at least one length of conductive yarn is electrically isolated from another of said lengths of conductive yarn,
- said second conducting layer has conductive yarn extending in a first direction and conductive yarn extending in a second direction, said first direction being different to said second direction,
- a plurality of electrical conductors are connected to said conductive yarns in the first of said layers thereby electrically grouping said conductive yarns to define a plurality of identifiable rows;
- at least one identifiable row includes a plurality of lengths of conductive yarn in which one length of conductive yarn of the identifiable row is electrically isolated from another of said lengths of conductive yarn; and
- said identifiable rows define specific regions of the detector.

* * * * *

UNITED STATES PATENT AND TRADEMARK OFFICE
CERTIFICATE OF CORRECTION

PATENT NO. : 7,161,084 B2
APPLICATION NO. : 09/980298
DATED : January 9, 2007
INVENTOR(S) : David L. Sandbach It is certified that error appears in the above-identified patent and that said Letters Patent is hereby corrected as shown below:

Title Page

Page 2, item [56]: foreign patent document DE 89 01 047 is a duplicate reference number with incorrect date and should be deleted.

Col. 24

Line 8, Claim 25, "yar" should be -- yarn --

Col. 26

Line 16, Claim 34, "detecter" should be -- detector --

Signed and Sealed this

Eighth Day of May, 2007

JON W. DUDAS
*Director of the United States Patent and Trademark Office*

UNITED STATES PATENT AND TRADEMARK OFFICE
CERTIFICATE OF CORRECTION

PATENT NO. : 7,161,084 B2
APPLICATION NO. : 09/980298
DATED : January 9, 2007
INVENTOR(S) : David L. Sandbach It is certified that error appears in the above-identified patent and that said Letters Patent is hereby corrected as shown below:

Title Page

Item: (73) Assignee: "Electrotextiles Company Limited" should be -- Eleksen Limited --

Signed and Sealed this

Fourteenth Day of August, 2007

JON W. DUDAS
*Director of the United States Patent and Trademark Office*